United States Patent
Domae et al.

(10) Patent No.: US 11,065,767 B2
(45) Date of Patent: Jul. 20, 2021

(54) OBJECT MANIPULATION APPARATUS AND OBJECT MANIPULATION METHOD FOR AUTOMATIC MACHINE THAT PICKS UP AND MANIPULATES AN OBJECT

(71) Applicant: MITSUBISHI ELECTRIC CORPORATION, Chiyoda-ku (JP)

(72) Inventors: Yukiyasu Domae, Chiyoda-ku (JP); Ryosuke Kawanishi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 252 days.

(21) Appl. No.: 16/082,371

(22) PCT Filed: Mar. 30, 2017

(86) PCT No.: PCT/JP2017/013407
§ 371 (c)(1),
(2) Date: Sep. 5, 2018

(87) PCT Pub. No.: WO2017/183414
PCT Pub. Date: Oct. 26, 2017

(65) Prior Publication Data
US 2019/0061159 A1 Feb. 28, 2019

(30) Foreign Application Priority Data
Apr. 22, 2016 (JP) ............................. JP2016-086373

(51) Int. Cl.
*B25J 9/16* (2006.01)
*B25J 19/06* (2006.01)

(52) U.S. Cl.
CPC ........... *B25J 9/1676* (2013.01); *B25J 9/1666* (2013.01); *B25J 9/1697* (2013.01); *B25J 19/06* (2013.01)

(58) Field of Classification Search
CPC ...... B25J 9/1676; B25J 9/1666; B25J 9/1697; B25J 19/06; B25J 9/1612; B25J 9/1669
See application file for complete search history.

(56) References Cited

U.S. PATENT DOCUMENTS

| 2014/0067121 A1 | 3/2014 | Brooks et al. |
| 2014/0277723 A1 | 9/2014 | Nishimura et al. |

(Continued)

FOREIGN PATENT DOCUMENTS

| JP | 2010-120139 A | 6/2010 |
| JP | 2014-176932 A | 9/2014 |

(Continued)

OTHER PUBLICATIONS

International Search Report dated May 16, 2017, in PCT/JP2017/013407, filed Mar. 30, 2017.

(Continued)

*Primary Examiner* — Khoi H Tran
*Assistant Examiner* — Nhi Q Bui
(74) *Attorney, Agent, or Firm* — Xsensus LLP

(57) ABSTRACT

An object recognizer recognizes a position and an attitude of a target object based on data measured by a sensor. A safe distance calculator calculates a distance from the target object to a certain object which is other than an object manipulation apparatus and the target object. A manipulation controller controls the pickup device based on the position and the attitude of the target object, and based on the distance from the target object to the certain object. When there are a plurality of target objects to be selected by the object manipulation apparatus, the manipulation controller selects one of the target objects having distances to the certain object longer than a predetermined threshold, and manipulates the selected target object using the pickup device.

14 Claims, 21 Drawing Sheets

(56) References Cited

U.S. PATENT DOCUMENTS

| | | | |
|---|---|---|---|
| 2014/0277725 A1 | 9/2014 | Kouno et al. | |
| 2014/0316573 A1* | 10/2014 | Iwatake | B25J 9/1697 700/258 |
| 2015/0120055 A1* | 4/2015 | Miyazawa | B25J 9/1697 700/259 |

FOREIGN PATENT DOCUMENTS

| | | |
|---|---|---|
| JP | 2014-176934 A | 9/2014 |
| JP | 2015-526309 A | 9/2015 |

OTHER PUBLICATIONS

Office Action dated Feb. 3, 2021, in corresponding Chinese patent Application No. 201780024149.5, 22 pages.

* cited by examiner

OBJECT MANIPULATION APPARATUS AND OBJECT MANIPULATION METHOD FOR AUTOMATIC MACHINE THAT PICKS UP AND MANIPULATES AN OBJECT

TECHNICAL FIELD

The present invention relates to an object manipulation apparatus and an object manipulation method for an automatic machine that picks up and manipulates an object while sharing work space with a person(s).

BACKGROUND ART

When an automatic machine such as a robot works while sharing work space with a human(s), it is necessary to consider safety against collisions with the human(s), and work efficiency for working quickly. For the purpose of achieving both safety and work efficiency, for example, the inventions of Patent Documents 1 and 2 are disclosed.

Patent Document 1 discloses that, in order to achieve both safety and efficiency, an automatic machine detects a human's position, and changes the operation speed of the automatic machine dependent on the distance between the automatic machine and the human. When the human approaches, the operation speed of the automatic machine is reduced to achieve safe work. When the human is remote, the operation speed of the automatic machine is increased to achieve efficient work.

Patent Document 2 discloses that both safety and work efficiency are achieved by changing operating modes. That is, an automatic machine is stopped or operated at low power dependent on the distance to a human (referred to as a "moving body" in Patent Document 2), and thus, achieving safety and also work efficiency.

CITATION LIST

Patent Documents

PATENT DOCUMENT 1: Japanese Patent Laid-open Publication No. JP 2015-526309 A
PATENT DOCUMENT 2: Japanese Patent Laid-open Publication No. JP 2014-176934 A

SUMMARY OF INVENTION

Technical Problem

Such automatic machines simply reduce the operation speed and output power of the automatic machine dependent on the positions of the automatic machine and the human. Therefore, there is a problem that, whenever the human is close to the automatic machine, the operation speed and/or output power are/is reduced, resulting in work efficiency remaining low.

An object of the present invention is to solve the above-described problem, and to provide an object manipulation apparatus and an object manipulation method capable of achieving both safety and efficiency, and capable of achieving efficient work even when a human approaches.

Solution to Problem

According to an aspect of the present invention, an object manipulation apparatus is provided with at least one sensor and at least one pickup device, for picking up and manipulating at least one target object using the pickup device. The object manipulation apparatus is further provided with: an object recognizer that recognizes a position and an attitude of the target object based on data measured by the sensor, a distance calculator that calculates a distance from the target object to a certain object which is other than the object manipulation apparatus and the target object, and a manipulation controller that controls the pickup device based on the position and the attitude of the target object, and based on the distance from the target object to the certain object. When there are a plurality of target objects to be selected by the object manipulation apparatus, the manipulation controller select one of the target objects having distances to the certain object longer than a predetermined threshold, and manipulates the selected target object using the pickup device.

Advantageous Effects of Invention

According to the present invention, the object manipulation apparatus selects a target object allowing efficient work, while determining the possibility of a collision with a human. Therefore, it is possible to achieve more efficient work than simply reducing the operation speed of the apparatus.

DESCRIPTION OF EMBODIMENTS

First Embodiment

Figure 1:
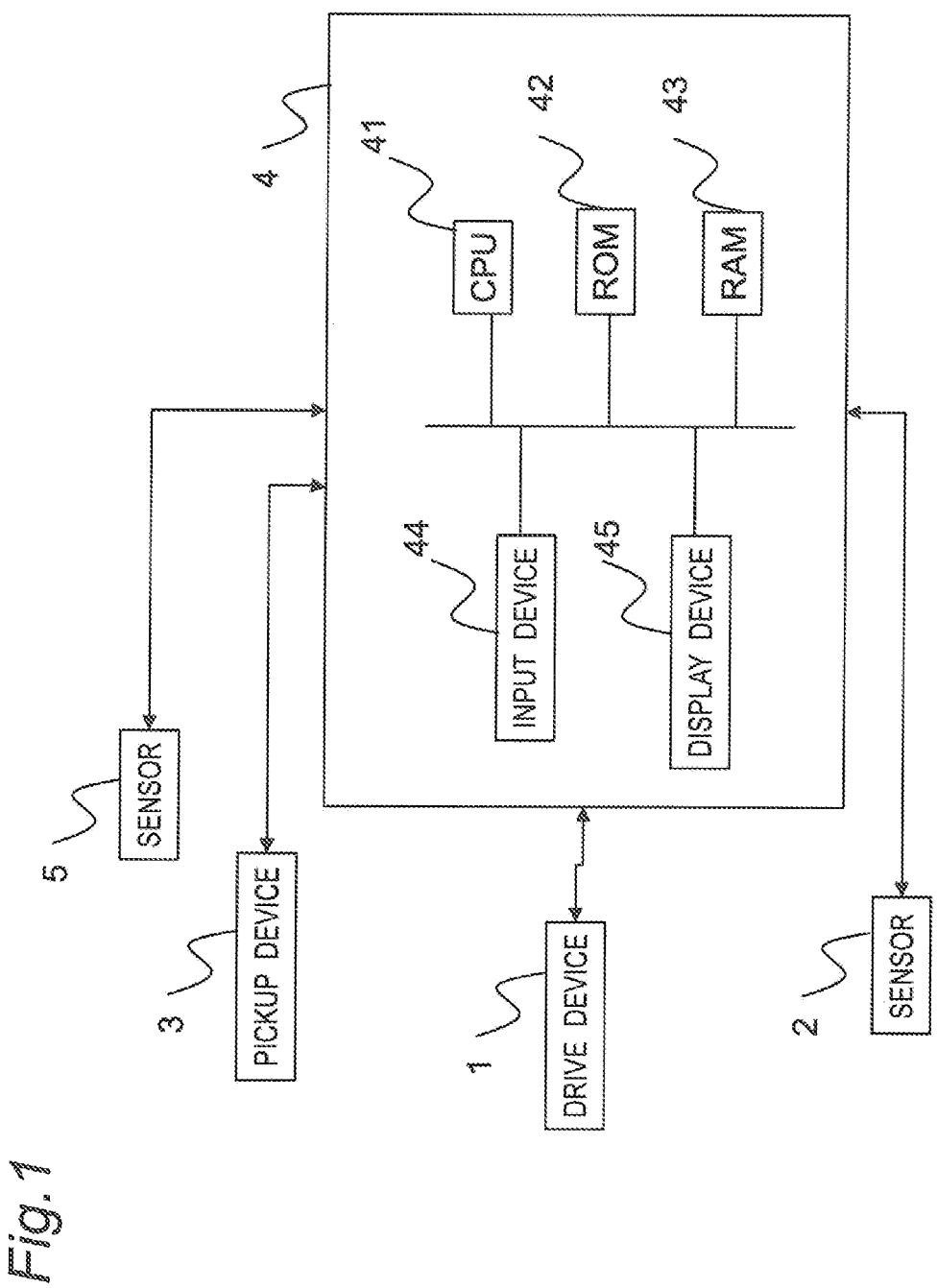
FIG. 1 is a hardware configuration diagram showing an object manipulation apparatus according to a first embodiment of the present invention.

FIG. 1 is a hardware configuration diagram showing an object manipulation apparatus according to a first embodiment of the present invention. The object manipulation apparatus of FIG. 1 is provided with at least one sensor and at least one pickup device, and using the pickup device, picks up and manipulates at least one object to be manipulated (hereinafter, referred to as a "target object").

The object manipulation apparatus of FIG. 1 is provided with a drive device 1, a sensor 2, a pickup device 3, an information processing device 4, and a sensor 5. The drive device 1, the sensor 2, the pickup device 3, and the sensor 5 are connected to the information processing device 4. The information processing device 4 is provided with a central processing unit (CPU) 41, a read-only memory (ROM) 42 storing execution programs, a random-access memory (RAM) 43 storing input and output signals, an input device 44 accepting a human's operations; and a display device 45 presenting information to a human. The input device 44 includes, for example, a mouse, a keyboard, a gesture recognition camera, a wearable acceleration sensor, etc. The display device 45 includes, for example, a display, etc.

The drive device 1 moves the sensor 2, the pickup device 3, and the sensor 5. The drive device 1 is used to move the sensors 2 and 5 to a point of view for measurement, and move the pickup device 3 to a position for manipulating a target object. Here, the drive device refers to a device providing movement under automatic control based on action commands, and may include a robot, a manipulator, a movable carriage, a linear axis, and a combination of a plurality of drive axes.

The sensor 2 measures an area around the object manipulation apparatus, and recognizes a position and an attitude of a target object. The sensor 2 is a camera or a three-dimensional vision sensor. The sensor 2 may be a pinhole camera, a rangefinder camera, a view camera, a light field camera, a stereo camera, an active stereo camera, a passive stereo camera, a photometric stereo camera, a sensor using the time-of-flight method, a sensor using the spatial encoding method, a sensor using the structured light method, or a laser scanner.

The pickup device 3 is a mechanism for manipulating a target object around the object manipulation apparatus. The pickup device 3 may be a suction-type pickup device that sucks and picks up a target object, or may be a pinch-type pickup device that pinches and picks up a target object. In addition, it is possible to arbitrarily select the number of nozzles of the suction-type pickup device, the number of fingers and nails of the pinch-type pickup device, and their shapes.

The sensor 5 measures an area around the object manipulation apparatus, and recognizes a position and an attitude of an object which is other than the object manipulation apparatus and a target object, which is present around the object manipulation apparatus, e.g., a human around the object manipulation apparatus. The sensor 5 may be a camera or a three-dimensional vision sensor, or may be a sensor that detects a sound wave, heat, light, vibration, or magnetism. The camera or three-dimensional vision sensor may be a pinhole camera, a rangefinder camera, a view camera, a light field camera, a stereo camera, an active stereo camera, a passive stereo camera, a photometric stereo system, a sensor using the time-of-flight method, a sensor using the spatial encoding method, a sensor using the structured light method, or a laser scanner, similar to the case of the sensor 2. The sensor that detects a sound wave, heat, light, vibration, or magnetism may be an optical sensor, a photoelectric element, a photodiode, an infrared sensor, a radiation sensor, a magnetic sensor, an ultrasonic range finder, a capacitive displacement sensor, or an optical position sensor. Obviously, the sensors 2 and 5 may be unified into one sensor of one type, and only the one sensor be used to recognize positions and attitudes of a target object and a human.

Figure 2:
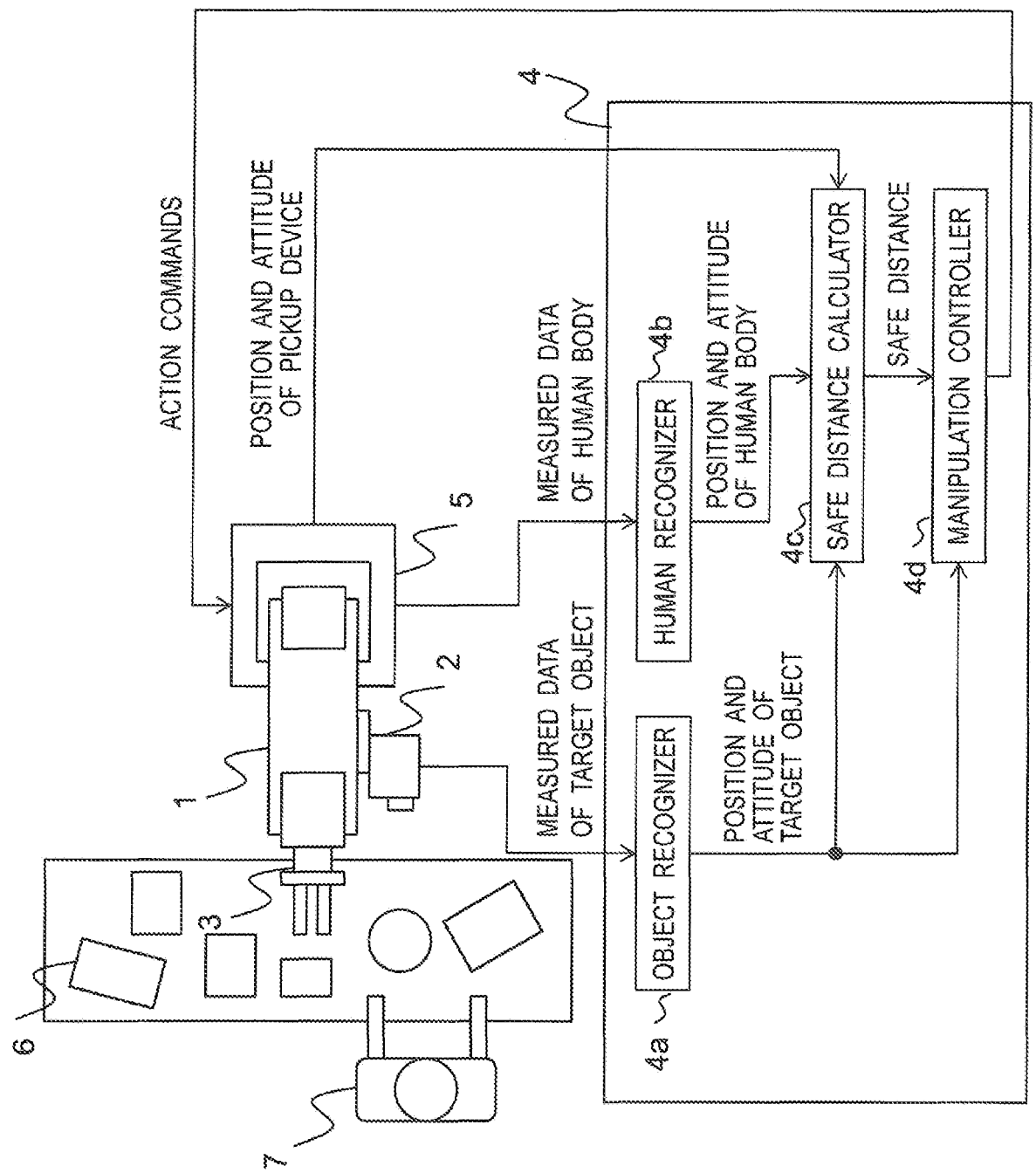
FIG. 2 is a functional diagram showing the object manipulation apparatus of FIG. 1.

FIG. 2 is a functional diagram showing the object manipulation apparatus of FIG. 1. In this case, the information processing device 4 is functionally provided with an object recognizer 4a, a human recognizer 4b, a safe distance calculator 4c, and a manipulation controller 4d. The object recognizer 4a recognizes the position and attitude of the target object based on data of the target object measured by the sensor 2. The human recognizer 4b recognizes a position and an attitude of the human around the object manipulation apparatus, based on data of the human measured by the sensor 5. The safe distance calculator 4c calculates a distance from the target object to a certain object which is other than the object manipulation apparatus and the target object, as a safe distance for the target object. The safe distance calculator 4c calculates the safe distance for the target object, based on the position and attitude of the human, and based on the position and attitude of the target object. The manipulation controller 4d generates action commands for controlling the pickup device 3 to pick up the target object, based on the position and attitude of the target object, and based on the safe distance for the target object. In the present specification, "safe" refers to conditions of low possibility that a robot collides with a human.

The object recognizer 4a recognizes the position and attitude of the target object based on data measured by the sensor 2. In this case, it is possible to extract a target object from an image and recognize a region, a position, and an attitude of the target object, using any general computer vision technique, such as: deleting a background region from a camera's image, a three-dimensional vision sensor's image, a range image, point cloud data, etc., to calculate the center of mass of the region of the target object; or fitting a model of the target object to an image, a range image, or point cloud data. It is also possible to define the position of the target object from the region of the target object in the image. The center of mass of the region may be defined as the position of the target object. The position of a point on a surface of the region, the point being closest to a specific position in space may be defined as the position of the target object. In this case, it is possible to apply chamfer matching, template matching, iterative closest point algorithm, feature extraction, hashing, machine learning techniques including deep learning, reinforcement learning techniques, or their derivations.

The human recognizer 4b recognizes the position and attitude of the human around the object manipulation apparatus, based on data measured for the human by the sensor 5. In this case, the human recognizer 4b can recognize the position of the human using any general computer vision technique, in a manner similar to that of the object recognizer 4a. In addition, the position and attitude of the human and a region of the human may be calculated by estimating an approximate position of the human using an optical sensor, a photoelectric element, a photodiode, an infrared sensor, a radiation sensor, a magnetic sensor, an ultrasonic range finder, a capacitive displacement sensor, an optical position sensor, etc., calculating a position of the human body closest to the drive device 1, and calculating a direction vector from this position to the drive device 1 as an attitude. The position of the human may be defined from the region of the human. The center of mass of the region may be defined as the position of the human. The position of a point on a surface of the region, the point being closest to a specific position in space may be defined as the position of the human. Thus, it is possible to calculate the position of the human.

The safe distance calculator 4c calculates the safe distance for the target object, based on the position and attitude of the human, and based on the position and attitude of the target object. Here, the safe distance refers to how close the human and the target object are to each other. The distance between the position of the human and the position of the target object is defined as the safe distance. When there are a plurality of humans and/or a plurality of target objects, safe distances are calculated among the humans and the target objects, respectively.

The manipulation controller 4d generates action commands for controlling the pickup device 3 to pick up the target object, based on the position and attitude of the target object, and based on the safe distance for the target object. When there are a plurality of target objects to be selected by the object manipulation apparatus, the manipulation controller selects one of target objects having safe distances longer than a predetermined threshold, and manipulates the selected target object using the pickup device 3.

Figure 3:
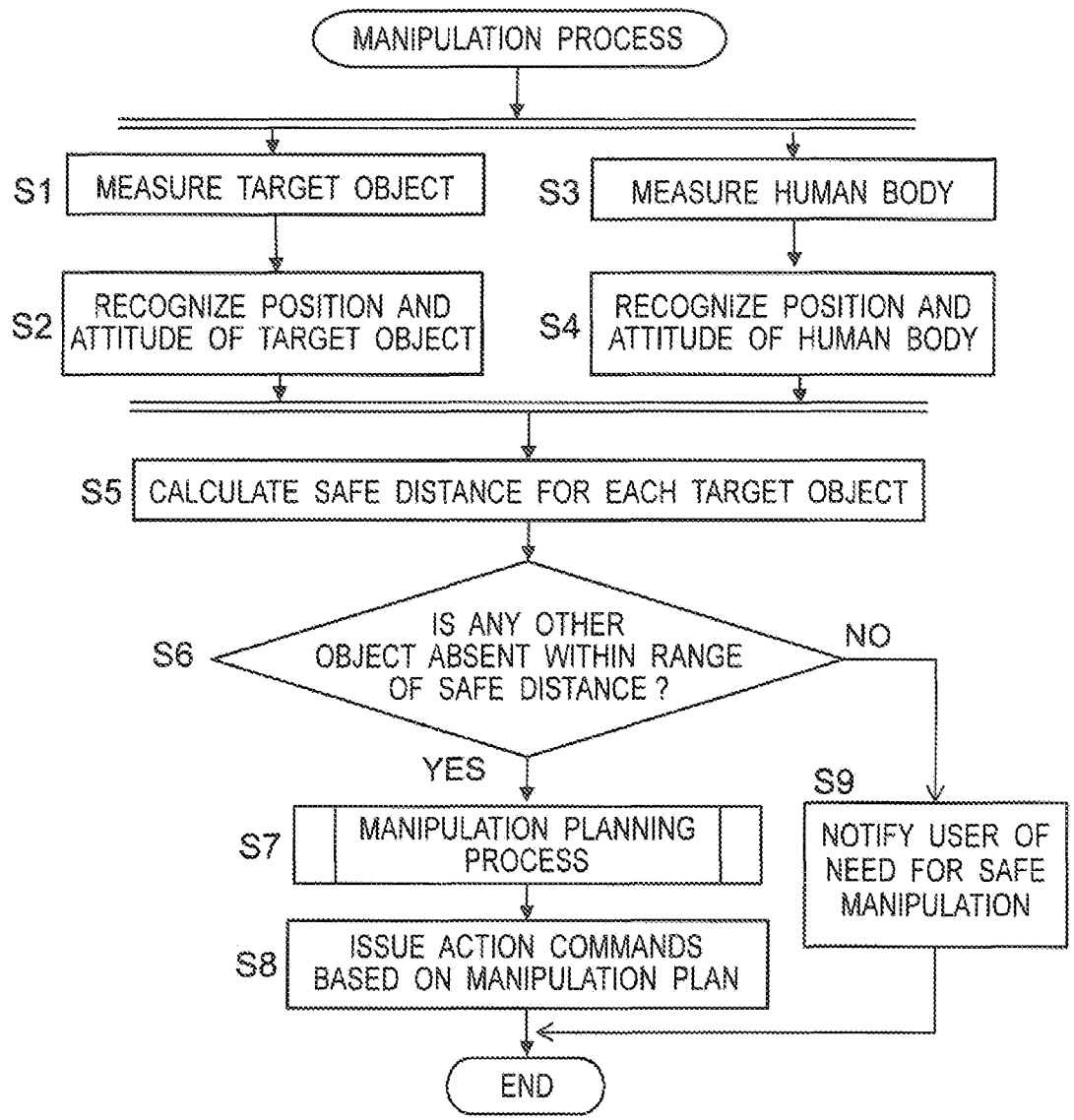
FIG. 3 is an overall process flowchart performed by the object manipulation apparatus of FIG. 1.

FIG. 3 is an overall process flowchart performed by the object manipulation apparatus of FIG. 1. At step S1 of FIG. 3, the information processing device 4 measures a target object using the sensor 2. At step S2, the information processing device 4 recognizes the position and attitude of the target object using the object recognizer 4a. At step S3, the information processing device 4 measures a human using the sensor 5. At step S4, the information processing device 4 recognizes the position and attitude of the human using the human recognizer 4b. At step S5, the information processing device 4 calculates a safe distance for each target object, using the safe distance calculator 4c. At step S6, the information processing device 4 determines, using the manipulation controller 4d, whether or not any other object is absent within a range of the safe distance; if YES, the process proceeds to step S7, and if NO, the process proceeds to step S9 At step S7, the information processing device 4 performs a manipulation planning process of FIG. 4, using the manipulation controller 4d.

Figure 4:
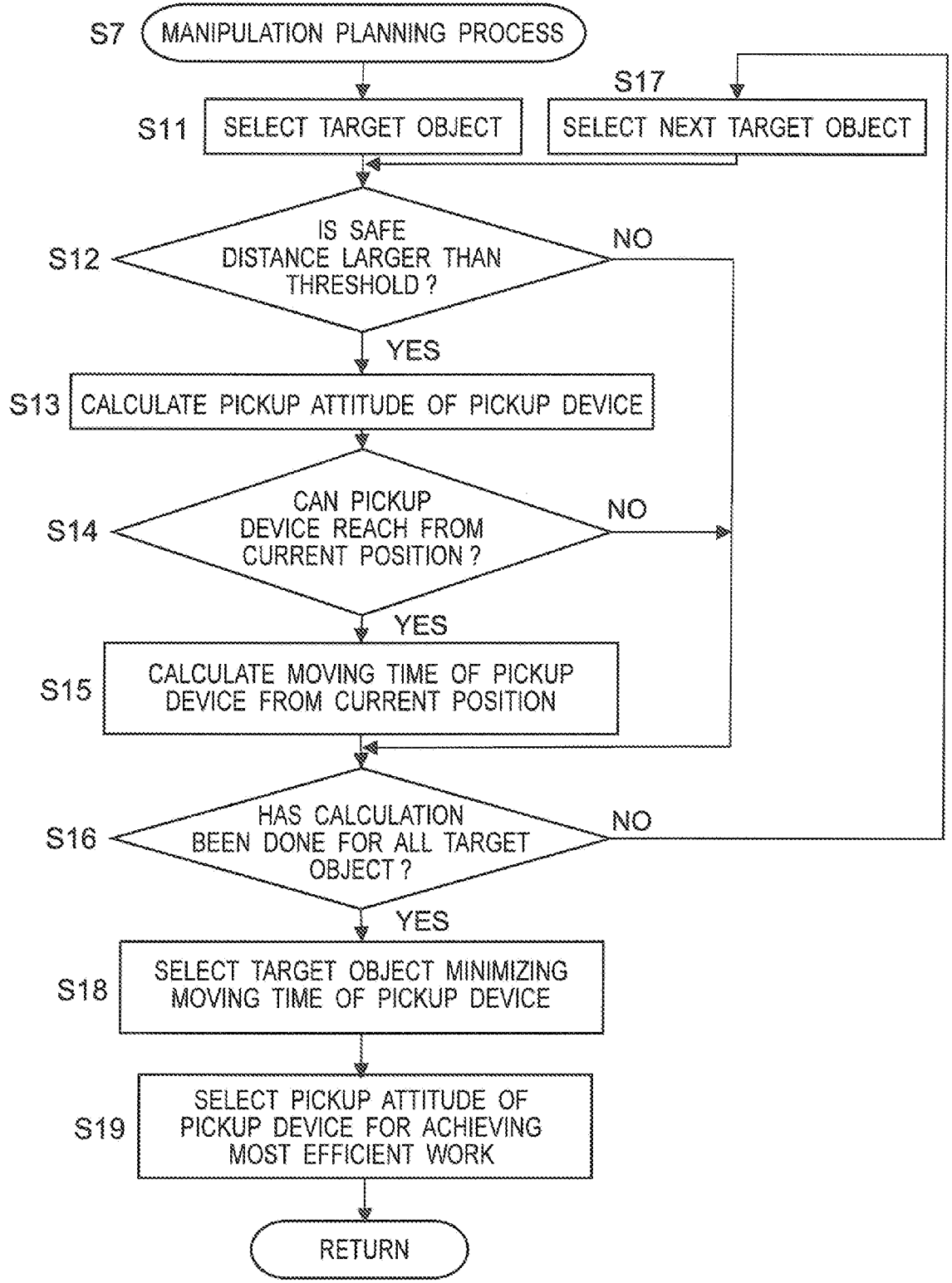
FIG. 4 is a process flowchart performed by a manipulation controller of the object manipulation apparatus of FIG. 1.

FIG. 4 is a process flowchart performed by the manipulation controller 4d of the object manipulation apparatus of FIG. 1. When there are a plurality of target objects around the object manipulation apparatus, the manipulation controller 4d according to the first embodiment determines which target object is safe and efficient for pickup, and generates and outputs action commands according to the determination.

At step S11 of FIG. 4, the manipulation controller 4d selects one of the plurality of target objects. At step S12, the manipulation controller 4d determines whether or not the safe distance for the target object is longer than a threshold; if YES, the process proceeds to step S13, and if NO, the process proceeds to step S16.

The threshold is determined with reference to operation speeds of the drive device 1 and the pickup device 3, weights of the drive device 1 and the pickup device 3, and a force applied to the drive device 1 and the pickup device 3 when they collide with each other. The threshold is determined such that, under conditions of high operation speeds, large weights, or a large force applied to each other upon collision, a long safe distance is set so as to reduce influence and damage of collision with a human. The manipulation controller 4d determines the threshold, for example, so as to increase the threshold as the weight and speed of the pickup device 3 increase, and to decrease the threshold as the weight and speed of the pickup device 3 decrease. When the safe distance for a certain target object is shorter than or equal to the threshold, the manipulation controller 4d determines the target object not to be a candidate for pickup, and continues a manipulation planning process for a next target object. When the safe distance for a certain target object is longer than the threshold, the manipulation controller 4d determines the target object to be a candidate for pickup, and calculates a pickup attitude of the pickup device 3 for picking up the target object.

At step S13, the manipulation controller 4d calculates a pickup attitude of the pickup device 3 for picking up the target object, based on the position and attitude of the target object. At step S14, the manipulation controller 4d determines whether or not the pickup device 3 can reach from its current position to the pickup attitude calculated at step S13; if YES, the process proceeds to step S15, and if NO, the process proceeds to step S16. Step S14 is done by determining whether or not interference between the object manipulation apparatus and its surrounding environment occurs, and whether or not kinematics of the drive device 1 can be solved. At step S15, the manipulation controller 4d calculates a moving time of the pickup device 3 from its current position. At step S16, the manipulation controller 4d determines whether or not the calculation has been done for all the target objects; if YES, the process proceeds to step S18, and if NO, the process proceeds to step S17. At step S17, the manipulation controller 4d selects a next target object among the plurality of target objects. At step S18, the manipulation controller 4d selects a target object minimizing the moving time of the pickup device, among the target objects having safe distances longer than the threshold. At step S19, the manipulation controller 4d selects a pickup attitude of the pickup device 3 for achieving the most efficient work. Thus, the manipulation controller 4d determines a manipulation plan for moving the pickup device 3 to the target object selected at step S18 and to the pickup attitude selected at step S19.

At step S8 of FIG. 3, the information processing device 4 issues action commands based on the manipulation plan determined at step S7. The information processing device 4 finally selects a pickup attitude of the pickup device 3 for achieving the shortest moving time, and selects a corresponding target object, and outputs action commands for picking up the target object.

At step S9 of FIG. 3, the information processing device 4 notifies a user of the need for safe manipulation. When there is any other object within the range of the safe distance, in order to manipulate an object, it is necessary to perform a process for safe manipulation, such as reducing the operation speeds of the drive device 1 and the pickup device 3, changing a work to be performed by the object manipulation apparatus, stopping the object manipulation apparatus, or issuing an alert to surroundings. Therefore, the information processing device 4 may notify the user to perform safe manipulation, or may automatically perform any of the above-described processes for safe manipulation.

For step S7 of FIG. 3, the information processing device 4 is preset with conditions of the shortest moving time, for selecting a target object in a prioritized manner. The information processing device 4 selects a target object to pick up, according to the preset priority. Although it is desirable that the information processing device 4 select a target object having the shortest moving time, the information processing device 4 may select a target object having a shorter moving time than that of at least one other target object (i.e., a target object having the second, third, . . . , shortest moving time). In addition, the information processing device 4 may select any one of a target object(s) having a moving time(s) shorter than a predetermined threshold.

According to the object manipulation apparatus according to the first embodiment, the object manipulation apparatus selects a target object and a pickup method that allow efficient work, while determining the possibility of a collision with a human. Therefore, it is possible to achieve more efficient work than simply reducing the operation speed of the apparatus.

According to the object manipulation apparatus according to the first embodiment, in an environment including the object manipulation apparatus, a plurality of target objects, and a human, the object manipulation apparatus can determine which one of the plurality of target objects is to be picked up for safety and efficiency. Therefore, it is possible to achieve more efficient work than simply reducing the operation speed when a human approaches.

Second Embodiment

Figure 5:
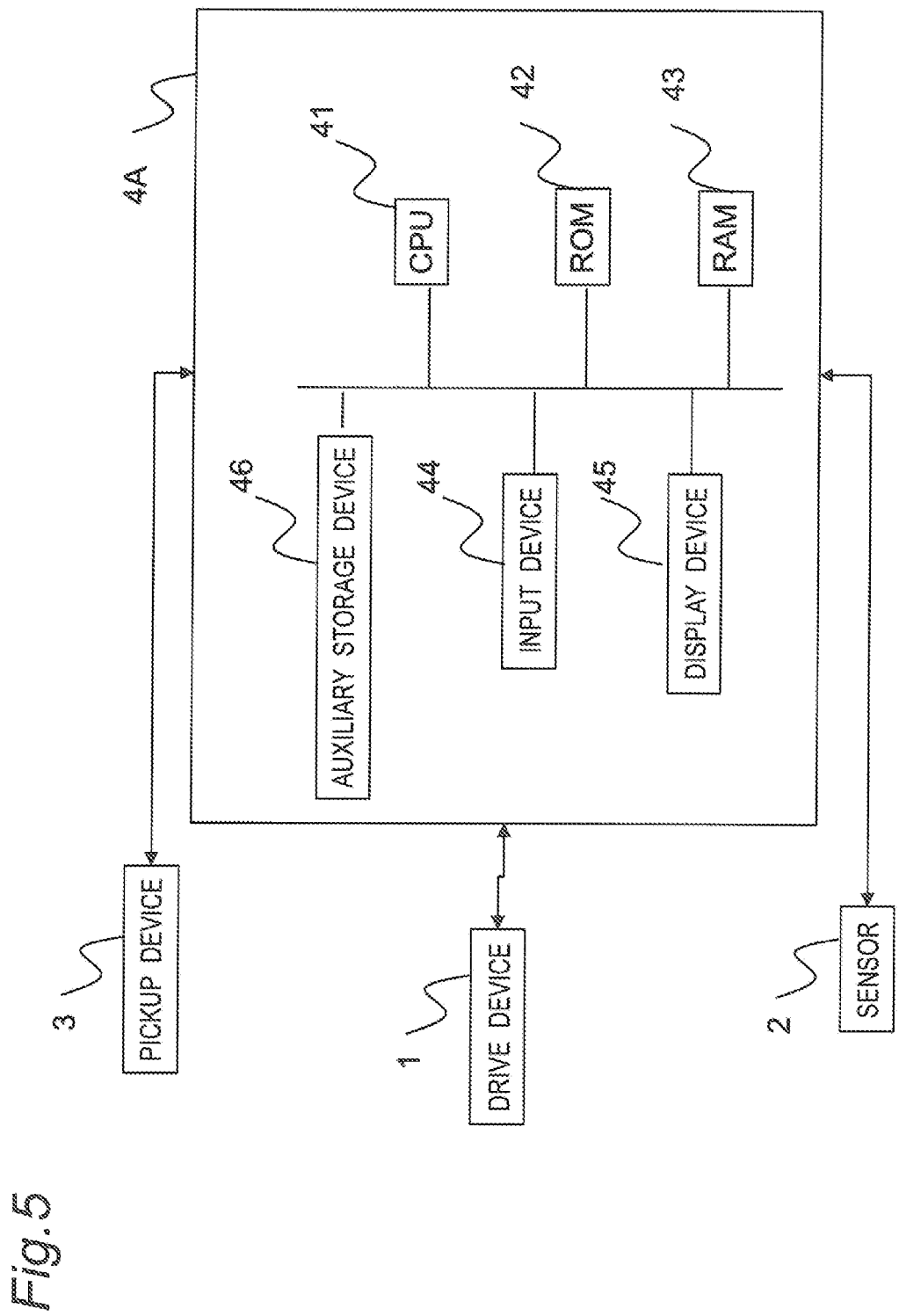
FIG. 5 is a hardware configuration diagram showing an object manipulation apparatus according to a second embodiment of the present invention.

FIG. 5 is a hardware configuration diagram showing an object manipulation apparatus according to a second embodiment of the present invention. The object manipulation apparatus of FIG. 5 is provided with an information processing device 4A, instead of the information processing device 4 and the sensor 5 of FIG. 1. The information processing device 4A is provided with an auxiliary storage device 4b, in addition to the components of the information processing device 4 of FIG. 1. The auxiliary storage device 4b is, for example, a hard disk drive or a solid-state drive.

According to the second embodiment, the information processing device 4A is provided with the auxiliary storage device 4b, instead of being connected to a sensor for recognizing a human. The auxiliary storage device 4b stores in advance a distance from a target object to a certain object which is other than the object manipulation apparatus and the target object. The auxiliary storage device 4b stores, for example, information on any predetermined point(s) or plane in space for safety. The information processing device 4A refers to the information stored in the auxiliary storage device 4b, instead of recognizing a human based on data measured by a sensor. Thus, it is possible to achieve safety while achieving more efficient work.

Figure 6:
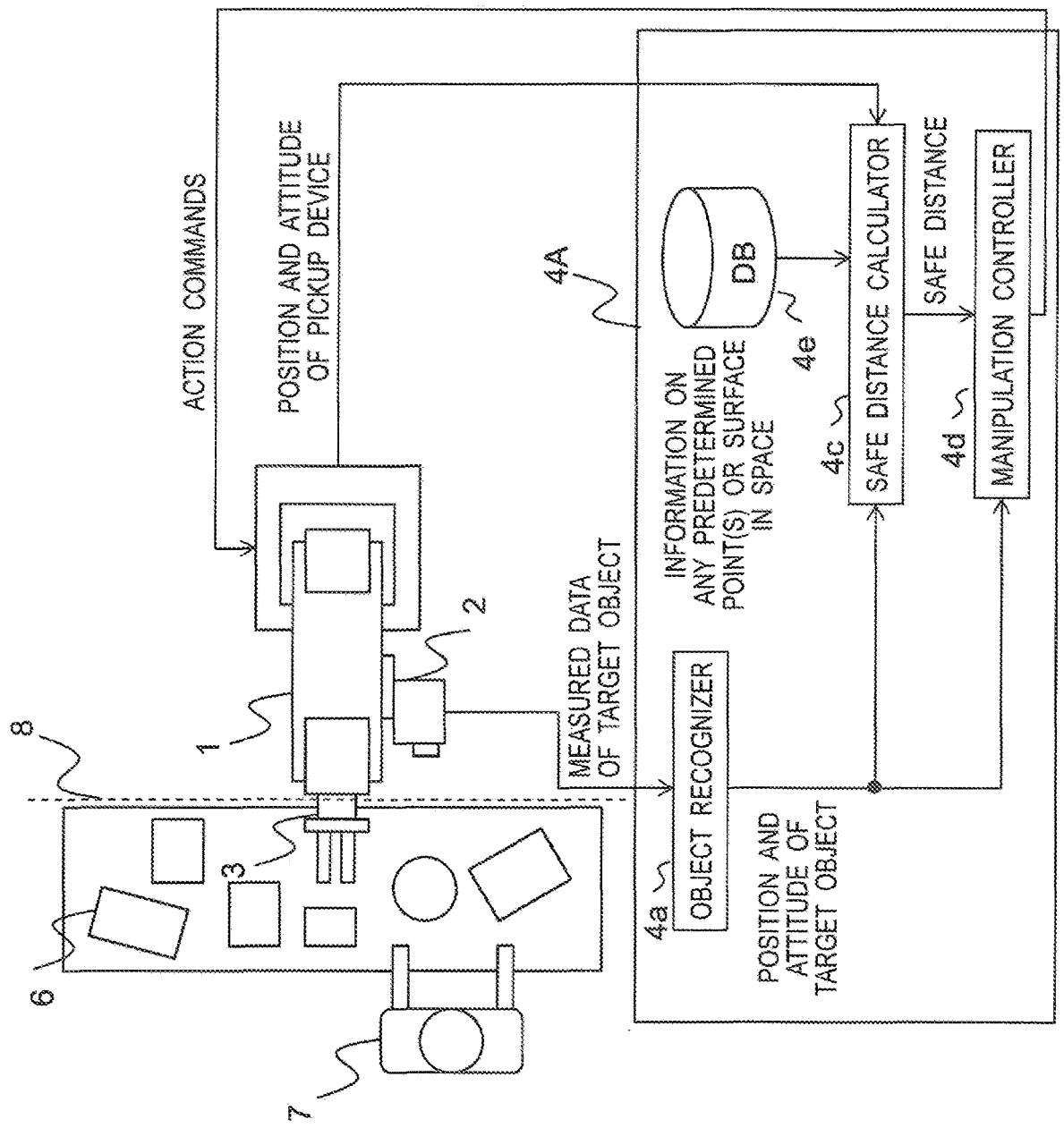
FIG. 6 is a functional diagram showing the object manipulation apparatus of FIG. 5.

FIG. 6 is a functional diagram showing the object manipulation apparatus of FIG. 5. The information processing device 4A of FIG. 6 is functionally provided with a database (DB) 4e, instead of the human recognizer 4b of FIG. 2. The database 4e resides on the auxiliary storage device 4b, and stores information on any predetermined point(s) or plane in space. A safe distance calculator 4c calculates a safe distance for a target object based on the information in the database 4e, and based on the position and attitude of the target object.

Figure 7:
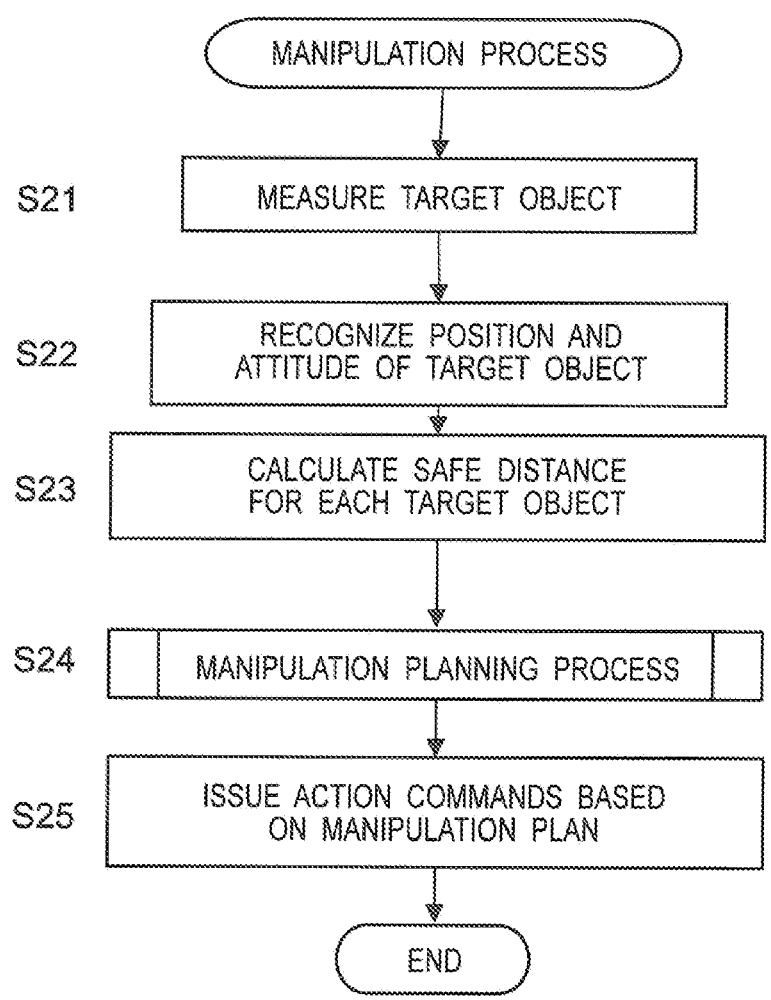
FIG. 7 is an overall process flowchart performed by the object manipulation apparatus of FIG. 5.

FIG. 7 is an overall process flowchart for the object manipulation apparatus of FIG. 5. At step S21 of FIG. 7, the information processing device 4A measures a target object using a sensor 2. At step S22 of FIG. 7, the information processing device 4A recognizes the position and attitude of the target object using an object recognizer 4a. At step S23 of FIG. 7, the information processing device 4A calculates a safe distance for each target object, using the safe distance calculator 4c. At step S24 of FIG. 7, the information processing device 4A performs a manipulation planning process using a manipulation controller 4d. At step S25 of FIG. 7, the information processing device 4A issues action commands based on a manipulation plan determined at step S24. Since the human recognizer of FIG. 2 is removed, it is possible to determine a manipulation plan for the target object by measuring a target object using the sensor 2. A change from the first embodiment is in a method for calculating a safe distance for each target object.

Figure 8:
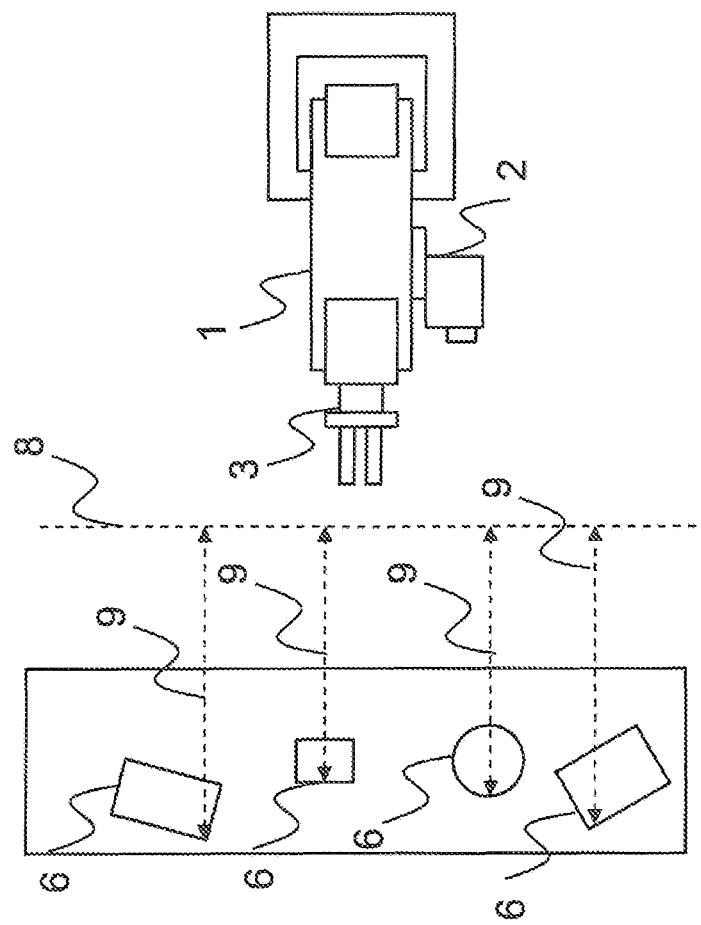
FIG. 8 is a diagram showing safe distances calculated based on information on any predetermined plane in space.

FIG. 8 is a diagram showing safe distances calculated based on information on any predetermined plane in space, according to the second embodiment of the present invention. The auxiliary storage device 4b stores information on any predetermined plane 8. This indicates, for example, that when a pickup device 3 works beyond the plane, the risk of a collision of the pickup device 3 with a human 7 increases. Referring to FIG. 8, there are a plurality of target objects 6 beyond the plane 8, as seen from the pickup device 3. For each target object 6, a distance between the plane 8 and a point on the target object the most distant from the plane 8 is calculated and defined as a safe distance 9. In this case, it is determined that the longer the safe distance is, the higher the possibility of a collision with the human is.

It is also possible to calculate a safe distance, even when using a predetermined "point" in space, instead of the plane 8.

The auxiliary storage device 4b stores in advance a distance from a target object to a certain object which is other than the object manipulation apparatus and the target object, instead of any predetermined plane and point in space.

By recognizing the position and attitude of a target object 6, it is possible to calculate a safe distance for the target object 6 based on a relationship with the plane 8. Then, it is possible to make a plan for manipulating the target object based on the safe distance for each target object, and based on the position and attitude of each target object, in a manner similar to that of the first embodiment.

As described above, according to the second embodiment, it is possible to make a safe and efficient manipulation plan based on data measured by the sensor 2, and based on information on any predetermined point(s) or plane in space, stored in the auxiliary storage device 4b.

Third Embodiment

Figure 9:
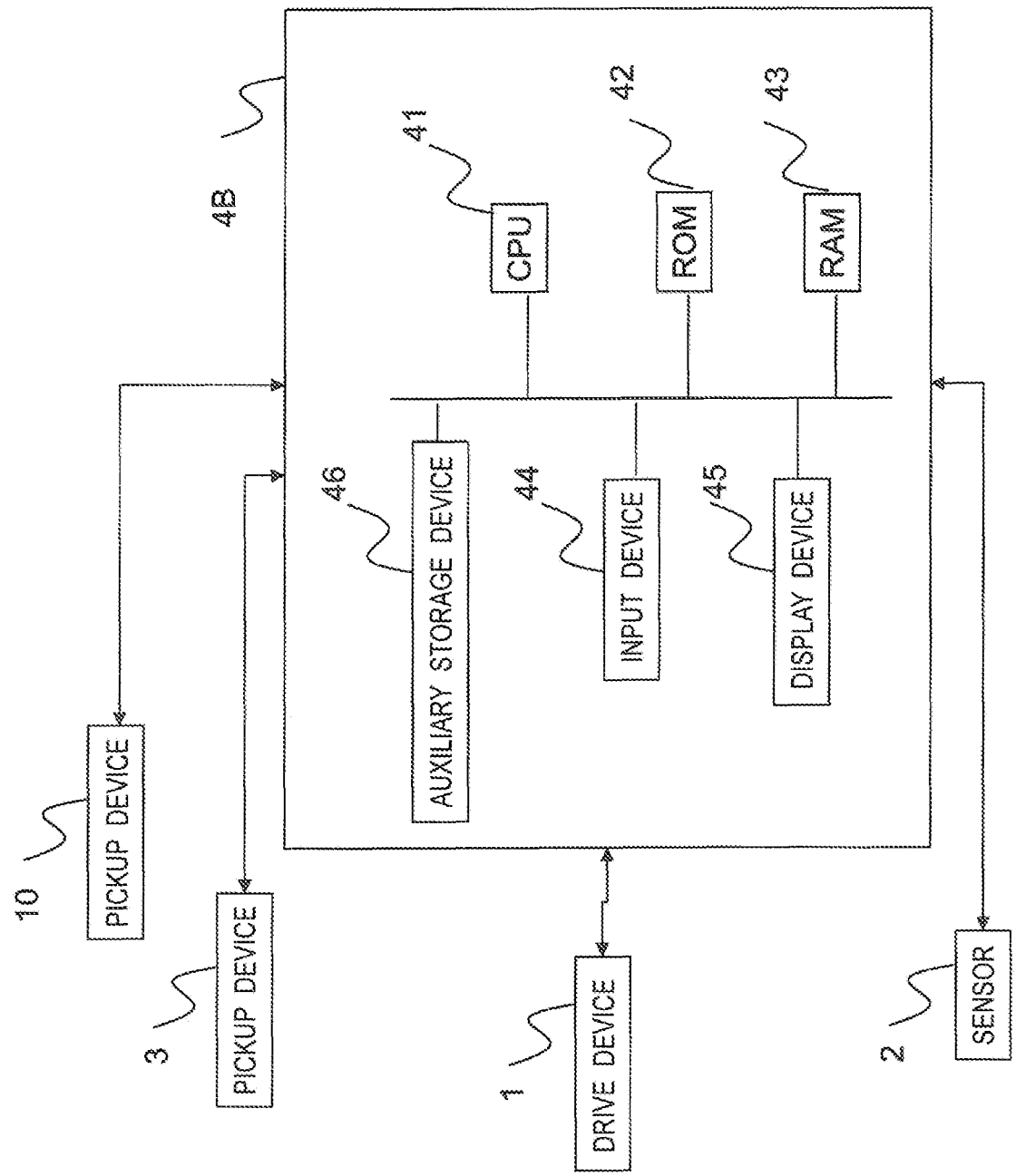
FIG. 9 is a hardware configuration diagram showing an object manipulation apparatus according to a third embodiment of the present invention.

FIG. 9 is a hardware configuration diagram showing an object manipulation apparatus according to a third embodiment of the present invention. The object manipulation apparatus of FIG. 9 is provided with an information processing device 4B, instead of the information processing device 4A of the object manipulation apparatus of FIG. 5, and further provide with a pickup device 10.

The object manipulation apparatus may be provided with a plurality of pickup devices to be selected, in order to manipulate various target objects. The plurality of pickup devices to be selected include different types of pickup devices, e.g., a pinch-type pickup device and a suction-type pickup device. According to the third embodiment, for the purpose of such work, the object manipulation apparatus is provided with two types of pickup devices, i.e., a pickup device 3 and the pickup device 10. In this case, it is determined not only which one of a plurality of target object is to be manipulated, but also which one of the plurality of pickup devices is used to pick up the target object. In this case, an overall processing flow is similar to that of FIG. 7, except for a processing flow for a manipulation controller, thus making a manipulation plan also including selection of a pickup device.

Figure 10:
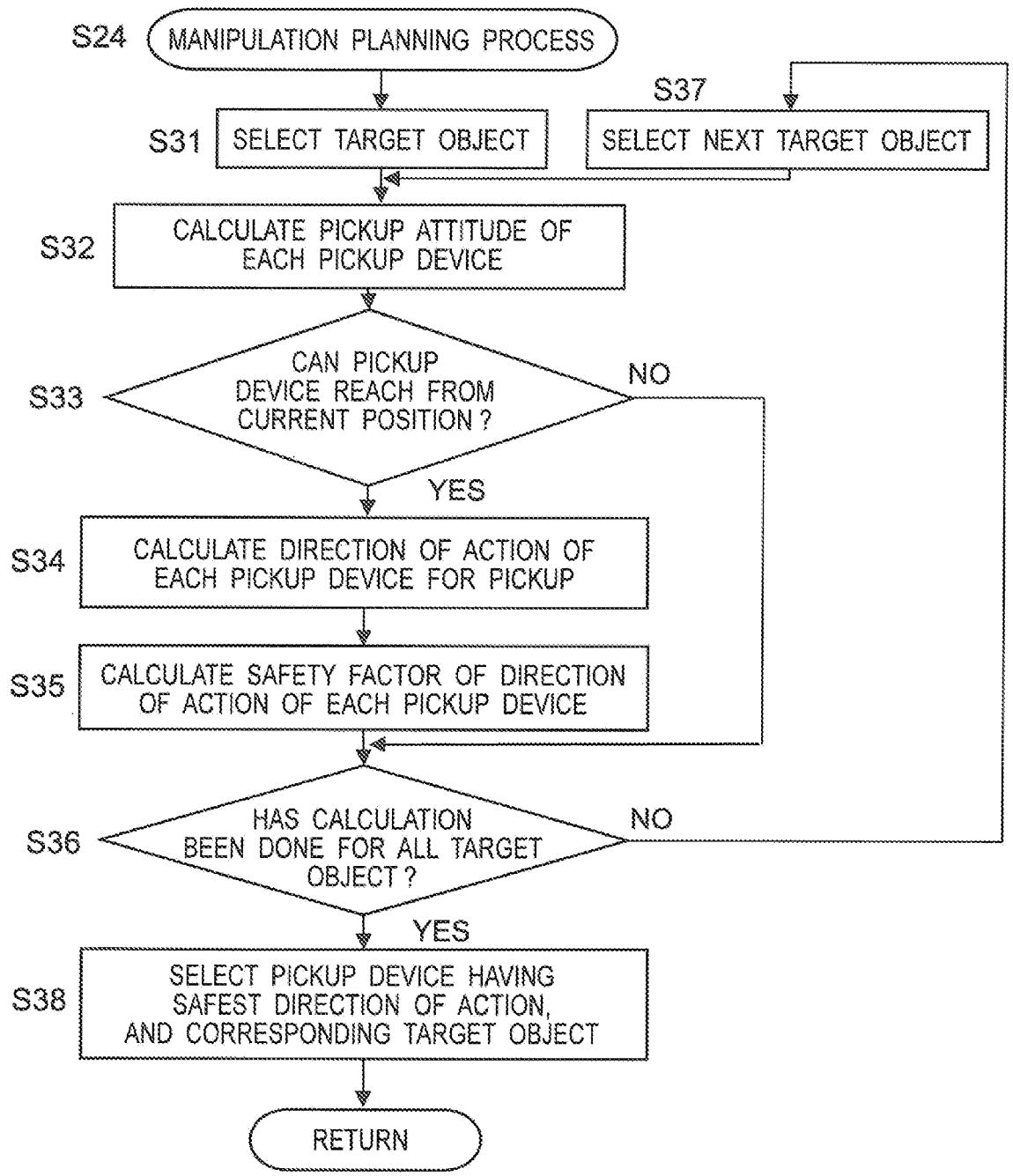
FIG. 10 is a process flowchart performed by the object manipulation apparatus of FIG. 9, in which a manipulation controller selects a pickup device and a target object for achieving safe operation.

FIG. 10 is a process flowchart performed by the object manipulation apparatus of FIG. 9, in which the manipulation controller selects a pickup device and a target object for achieving safe operation. A pickup device and a target object are determined based on the positions and attitudes of target objects, and based on the safe distances for the target objects, to output action commands for taking a corresponding pickup attitude of the pickup device At step S31 of FIG. 10, the manipulation controller 4d selects one of a plurality of target objects. At step S32, the manipulation controller 4d calculates a pickup attitude of each pickup device for picking up the target object, based on the position and attitude of the target object. In this case, since there are a plurality of types of pickup devices, respective pickup attitudes of these pickup devices are calculated. At step S33, the manipulation controller 4d determines whether or not each pickup device can reach from its current position to the pickup attitude calculated at step S32; if YES, the process proceeds to step S34, and if NO, the process proceeds to step S36.

At step S34, the manipulation controller 4d calculates a direction of action of each pickup device for pickup, based on the safe distance for the target object. At step S35, the manipulation controller 4d calculates a safety factor of each pickup device in the calculated direction of action.

Figure 11:
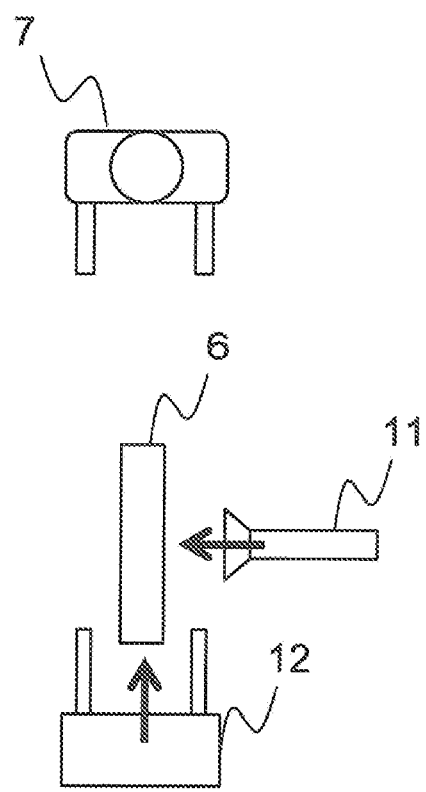
FIG. 11 is a diagram showing different directions of action of the pickup devices for pickup.

When the same target object is picked up by different pickup devices, these pickup devices may have different directions of action from each other, for example, as shown in FIG. 11. Referring to FIG. 11, when a pinch-type pickup device 12 picks up a target object 6, the pinch-type pickup device 12 has a direction of action toward a human 7. On the other hand, when a suction-type pickup device 11 picks up the target object 6, since the suction-type pickup device 11 approaches a wide side of the target object 6, the suction-type pickup device 11 has a direction of action different from the direction of action of the pinch-type pickup device 12. When the pickup device works toward the human in a manner similar to that of the pinch-type pickup device 12 of FIG. 11, the possibility of a collision between the pickup device 12 and the human increases. Hence, according to the processing flow of FIG. 10, the manipulation controller 4d calculates the directions of action of the having pickup devices for pickup, and then, calculates the safety factors of the having pickup devices in the calculated directions of action, and selects a pickup device having the safest direction of action, and selects a corresponding target object.

At step S36, the manipulation controller 4d determines whether or not the calculation has been done for all the target objects; if YES, the process proceeds to step S38, and if NO, the process proceeds to step S37. At step S37, the manipulation controller 4d selects a next target object among the plurality of target objects. At step S38, the manipulation controller 4d selects a pickup device having the safest direction of action, and selects a corresponding target object.

Figure 12:
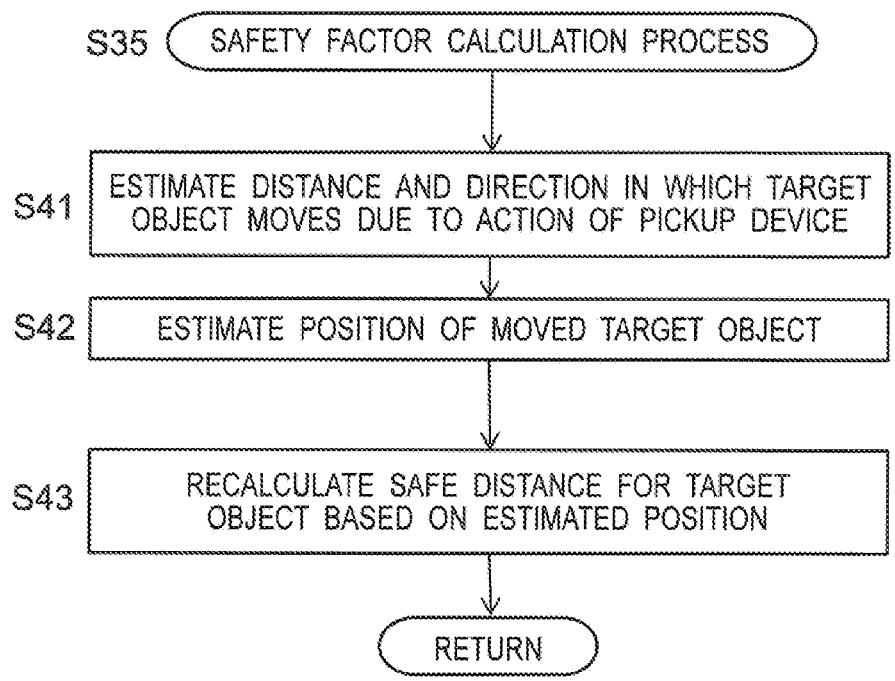
FIG. 12 is a process flowchart performed by the object manipulation apparatus of FIG. 9, for calculating a safety factor for a direction of action of each pickup device.

FIG. 12 is a process flowchart performed by the object manipulation apparatus of FIG. 9, for calculating a safety factor for a direction of action of each pickup device. At step S41 of FIG. 12, the manipulation controller 4d estimates a distance and a direction in which the target object moves due to action of the pickup device, based on the moving direction of the pickup device. At step S42, the manipulation controller 4d estimates a position of the moved target object, based on an estimation result obtained at step S41. At step S43, the manipulation controller 4d recalculates a safe distance for the target object from the estimated position. The safe distance for the target object may be calculated based on a position and an attitude of a human recognized by the human recognizer, in a manner similar to that of the first embodiment, or may be calculated based on information on any predetermined point(s) or plane in space for safety, in a manner similar to that of the second embodiment. By the above processes, it is possible to select a pickup device for safe operation, and a target object to pick up.

Thus, the manipulation controller 4d estimates positions of a target object manipulated by the pickup devices, selects one of pickup devices having safe distances from the estimated positions longer than the threshold, and manipulates the selected target object. The manipulation controller 4d selects a pickup device having the minimum moving time, among the pickup devices having the safe distances from the estimated positions longer than the threshold, and manipulates the selected target object. Thus, it is possible to make a manipulation plan for achieving safe and efficient work.

Figure 13:
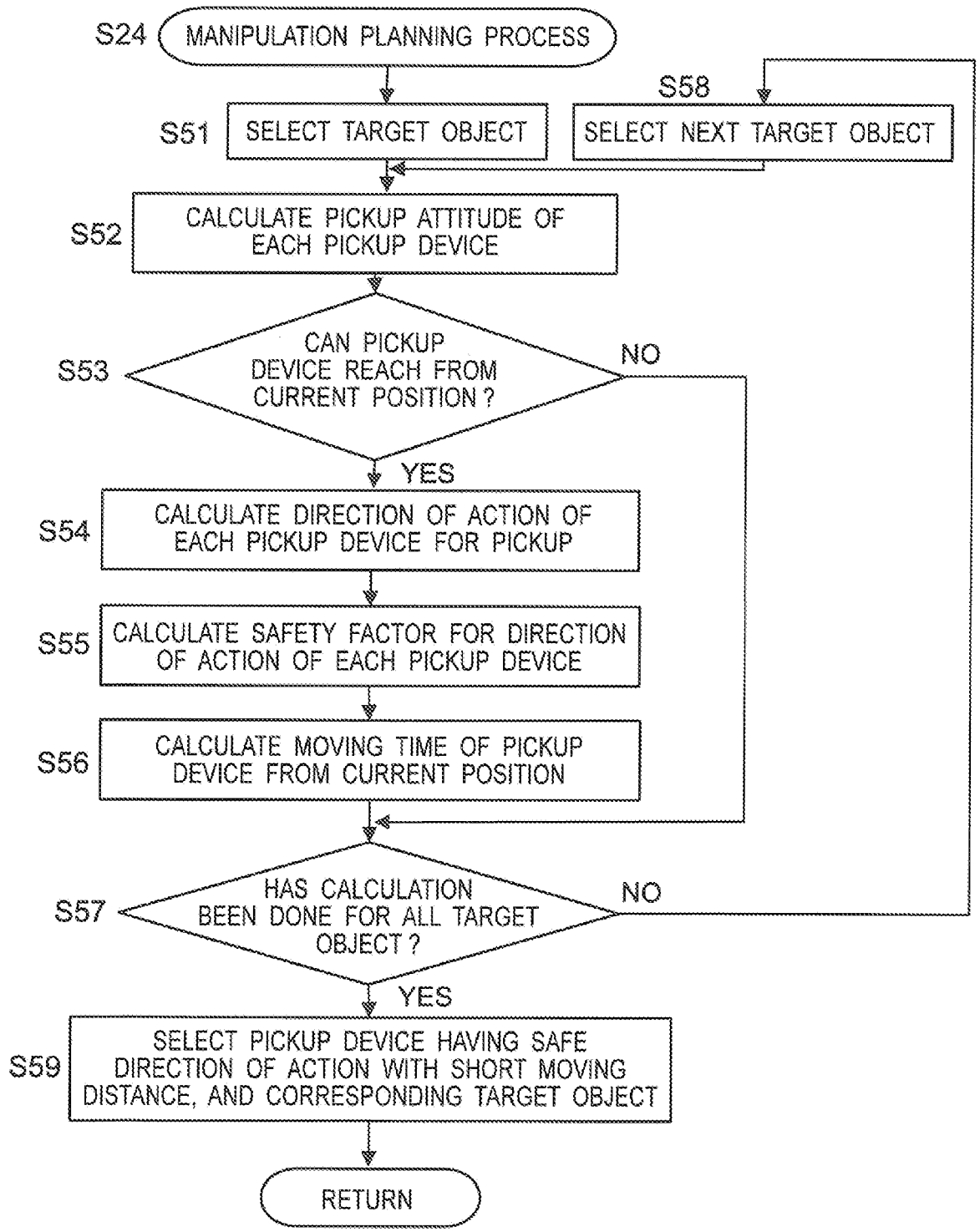
FIG. 13 is a process flowchart performed by the object manipulation apparatus of FIG. 9, in which the manipulation controller selects a pickup device and a target object for achieving safe and efficient operation.
Figure 14:
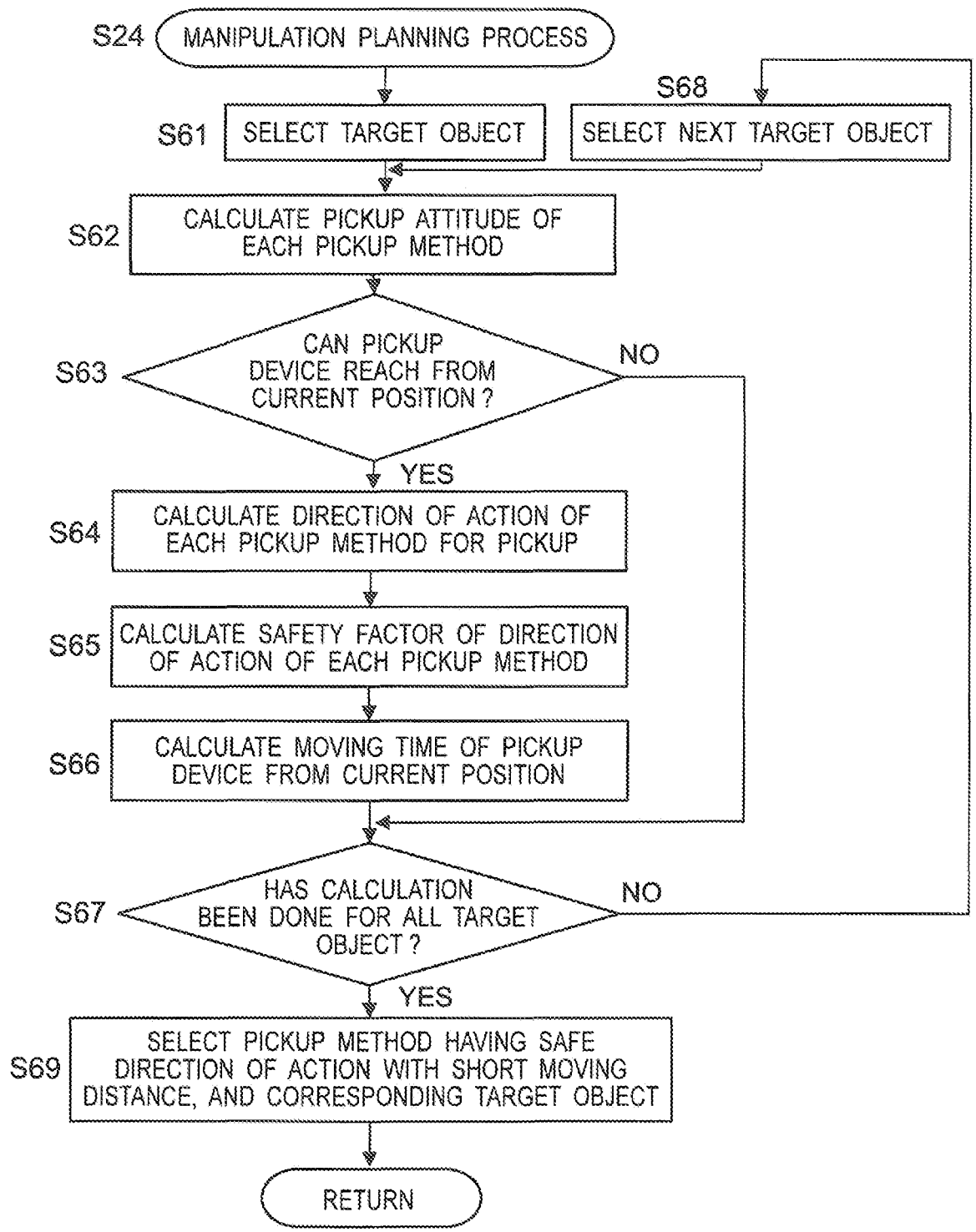
FIG. 14 is a process flowchart performed by the object manipulation apparatus of FIG. 9, in which the manipulation controller selects a pickup method, a pickup device, and a target object for achieving safe and efficient operation.

Further, FIGS. 13 and 14 show process flowcharts for the manipulation controller for achieving both safety and efficiency.

FIG. 13 is a process flowchart performed by the object manipulation apparatus of FIG. 9, in which the manipulation controller selects a pickup device and a target object for achieving safe and efficient operation. In this case, comparing to the flowchart shown in FIG. 10, the manipulation controller 4d further calculates a moving time required for a pickup device to move from its current position to its pickup attitude, and finally selects a pickup device having a safe direction of action with a short moving time, and selects a corresponding target object.

At step S51 of FIG. 13, the manipulation controller 4d selects one of a plurality of target objects. At step S52, the manipulation controller 4d calculates a pickup attitude of each pickup device for picking up the target object, based on the position and attitude of the target object. At step S53, the manipulation controller 4d determines whether or not each pickup device can reach from its current position to the pickup attitude calculated at step S52; if YES, the process proceeds to step S54, and if NO, the process proceeds to step S57.

At step S54, the manipulation controller 4d calculates directions of action of each pickup device for pickup, based on the safe distance for the target object. At step S55, the manipulation controller 4d calculates a safety factor of each pickup device in the calculated direction of action. At step S56, the manipulation controller 4d calculates a moving time of each pickup device from its current position.

At step S57, the manipulation controller 4d determines whether or not the calculation has been done for all the target objects; if YES, the process proceeds to step S59, and if NO, the process proceeds to step S58. At step S58, the manipulation controller 4d selects a next target object among the plurality of target objects. At step S59, the manipulation controller 4d selects a pickup device having a safe direction of action with a short moving time, and selects a corresponding target object.

When both safety and moving time are achieved, an evaluation function: F=aS+bT may be used. "S" denotes a safety factor dependent on the direction of action, and is defined by the safe distance. "T" denotes the moving time of the pickup device from its current position. "a" and "b" denote arbitrary weight coefficients, and are adjusted dependent on whether to prioritize safety or efficiency of work. The evaluation function may further include weights for normalizing the respective factors.

According to the manipulation planning process of FIG. 13, the information processing device 4B is preset with conditions of safety and a short moving time, for selecting a pickup device in a prioritized manner. The information processing device 4B selects a pickup device according to the preset priority. Although it is desirable that the information processing device 4B select a pickup device having the shortest moving time, the information processing device 4B may select a pickup device having a shorter moving time than that of at least one other pickup device (i.e., a pickup device having the second, third, . . . , shortest moving time). In addition, the information processing device 4B may select any one of a pickup device(s) having a moving time(s) shorter than a predetermined threshold.

As described above, a manipulation plan is determined by automatically selecting a pickup device and a target object so as to achieve both safety and efficiency.

For example, in the case that a pinch-type pickup device picks up a target object, even when the pickup device can not pinch the target object, the pickup device may press itself against the target object to "scrape out" the target object. Thus, one pickup device may have a plurality of different pickup methods. Also in this case, it is possible to select a pickup method and determine a manipulation plan in a manner similar to that described above.

FIG. 14 is a process flowchart performed by the object manipulation apparatus of FIG. 9, in which the manipulation controller selects a pickup method, a pickup device, and a target object for achieving safe and efficient operation. When at least one pickup device has a plurality of pickup methods to be selected, it is possible to select a pickup method by calculating a direction of action of each pickup method for pickup, in a manner similar to that of the case in which there are a plurality of pickup devices.

At step S61 of FIG. 14, the manipulation controller 4d selects one of a plurality of target objects. At step S62, the manipulation controller 4d calculates a pickup attitude of each pickup method for picking up the target object, based on the position and attitude of the target object. At step S63, the manipulation controller 4d determines whether or not each pickup device can reach from its current position to the pickup attitude calculated at step S62; if YES, the process proceeds to step S64, and if NO, the process proceeds to step S67.

At step S64, the manipulation controller 4d calculates a direction of action of each pickup method for pickup, based on the safe distance for the target object. At step S65, the manipulation controller 4d calculates a safety factor of the direction of action of each pickup method. At step S66, the manipulation controller 4d calculates a moving time of each pickup device from its current position.

At step S67, the manipulation controller 4d determines whether or not the calculation has been done for all the target objects; if YES, the process proceeds to step S69, and if NO, the process proceeds to step S68. At step S68, the manipulation controller 4d selects a next target object among the plurality of target objects. At step S69, the manipulation controller 4d selects a pickup method having a safe direction of action with a short moving time, and selects a corresponding target object.

According to the manipulation planning process of FIG. 14, the information processing device 4B is preset with conditions of the shortest moving time, for selecting a pickup method in a prioritized manner. The information processing device 4B selects a pickup method according to the preset priority. Although it is desirable that the information processing device 4B select a pickup method having the shortest moving time, the information processing device 4B may select a pickup method having a moving time shorter than that of a moving time of a pickup device using at least one other pickup method (i.e., a pickup method having the second, third, . . . , shortest moving time). In addition, the information processing device 4B may select any one of pickup method(s) having a moving time(s) shorter than a predetermined threshold.

Thus, the manipulation controller 4d estimates positions of a target object manipulated by the pickup methods, selects one of pickup methods having safe distances from the estimated positions longer than the threshold, and manipulates the selected target object. The manipulation controller 4d selects a pickup method minimizing the moving time of the pickup device, among the pickup methods having the safe distances from the estimated positions longer than the threshold, and manipulates the selected target object.

In addition, when there are a plurality of target objects to be selected, a plurality of pickup devices to be selected, and a plurality of pickup methods to be selected, it is possible to similarly select a target object, a pickup device, and a pickup method, and determine a manipulation plan.

By the above-described method, it is possible to select a target object, a pickup device, and a pickup method in a safe and efficient manner.

Fourth Embodiment

Figure 15:
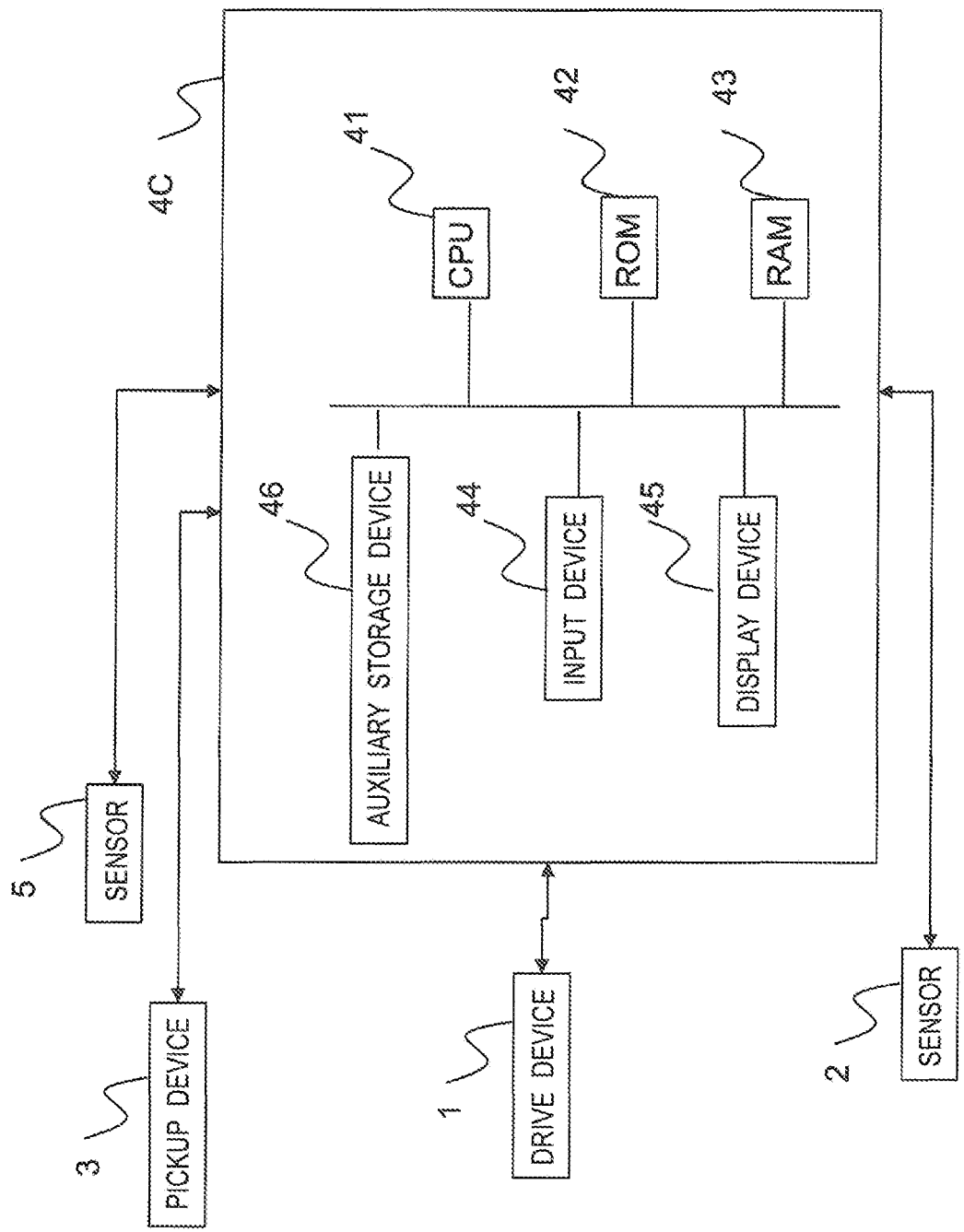
FIG. 15 is a hardware configuration diagram showing an object manipulation apparatus according to a fourth embodiment of the present invention.

FIG. 15 is a hardware configuration diagram showing an object manipulation apparatus according to a fourth embodiment of the present invention. The object manipulation apparatus of FIG. 15 is provided with an information processing device 4C, instead of the information processing device 4 of FIG. 1. The information processing device 4C is provided with an auxiliary storage device 46 in addition to the components of the information processing device 4 of FIG. 1, in a manner similar to that of the information processing device 4A of FIG. 5. The auxiliary storage device 46 is, as described above, for example, a hard disk drive or a solid-state drive.

Figure 16:
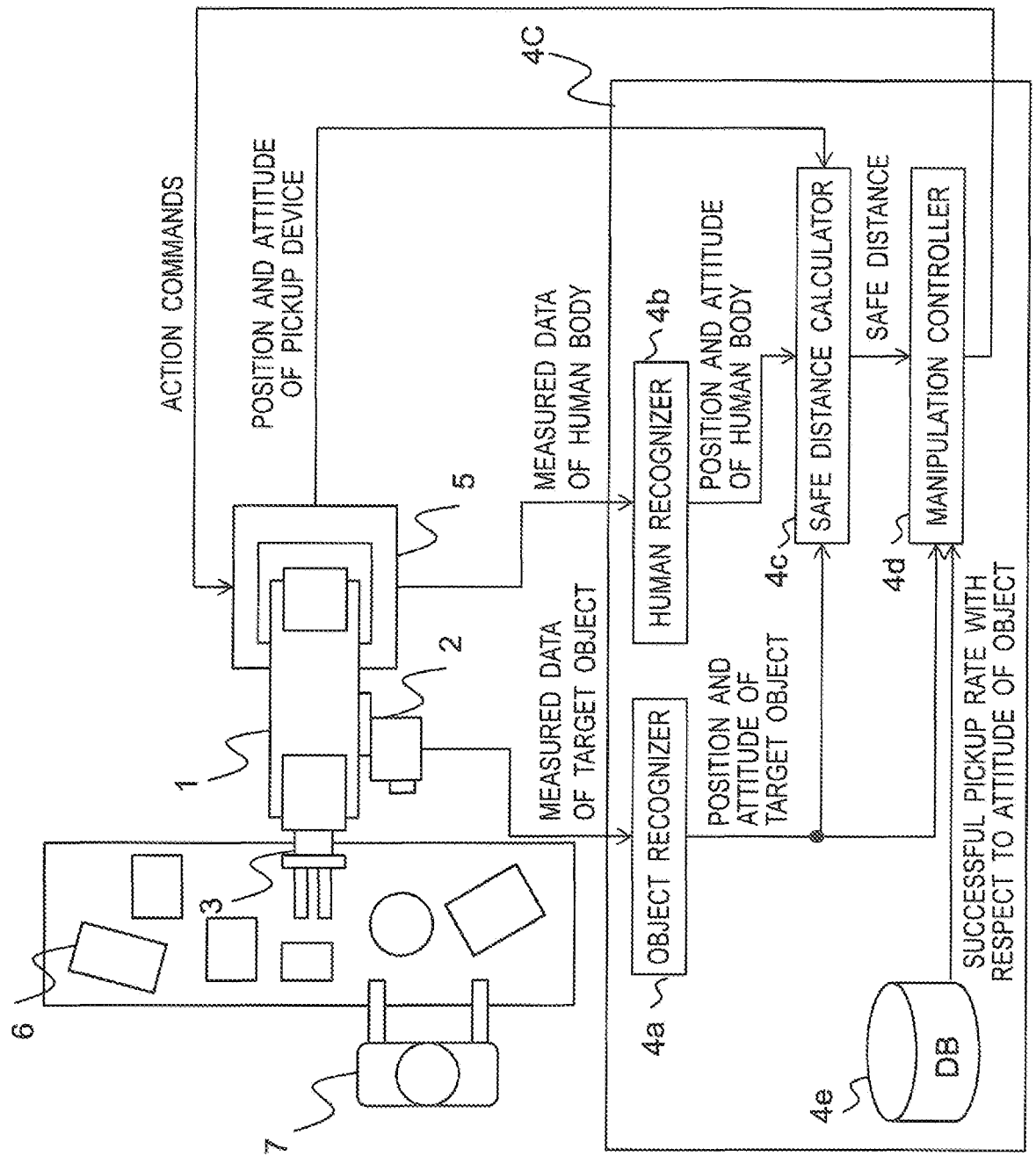
FIG. 16 is a functional diagram showing the object manipulation apparatus of FIG. 15.

FIG. 16 is a functional diagram showing the object manipulation apparatus of FIG. 15. A database (DB) 4e resides on the auxiliary storage device 46, and stores successful pickup rates which are estimated in advance for each attitude of an object and each pickup attitude of a pickup device 3. The successful pickup rates may be experimentally obtained in advance using an apparatus having a similar hardware configuration. The successful pickup rates may be estimated by a physical simulation based on CAD data of an object and CAD data of the pickup device 3 for grabbing the object.

The object manipulation apparatus of FIG. 15 also operates according to the overall process flowchart of FIG. 3. However, that a manipulation controller 4d of the information processing device 4C performs a manipulation planning process (step S7A) of FIG. 17 or a manipulation planning process (step S7B) of FIG. 18, instead of the manipulation planning process (step S7) of FIG. 4.

Figure 17:
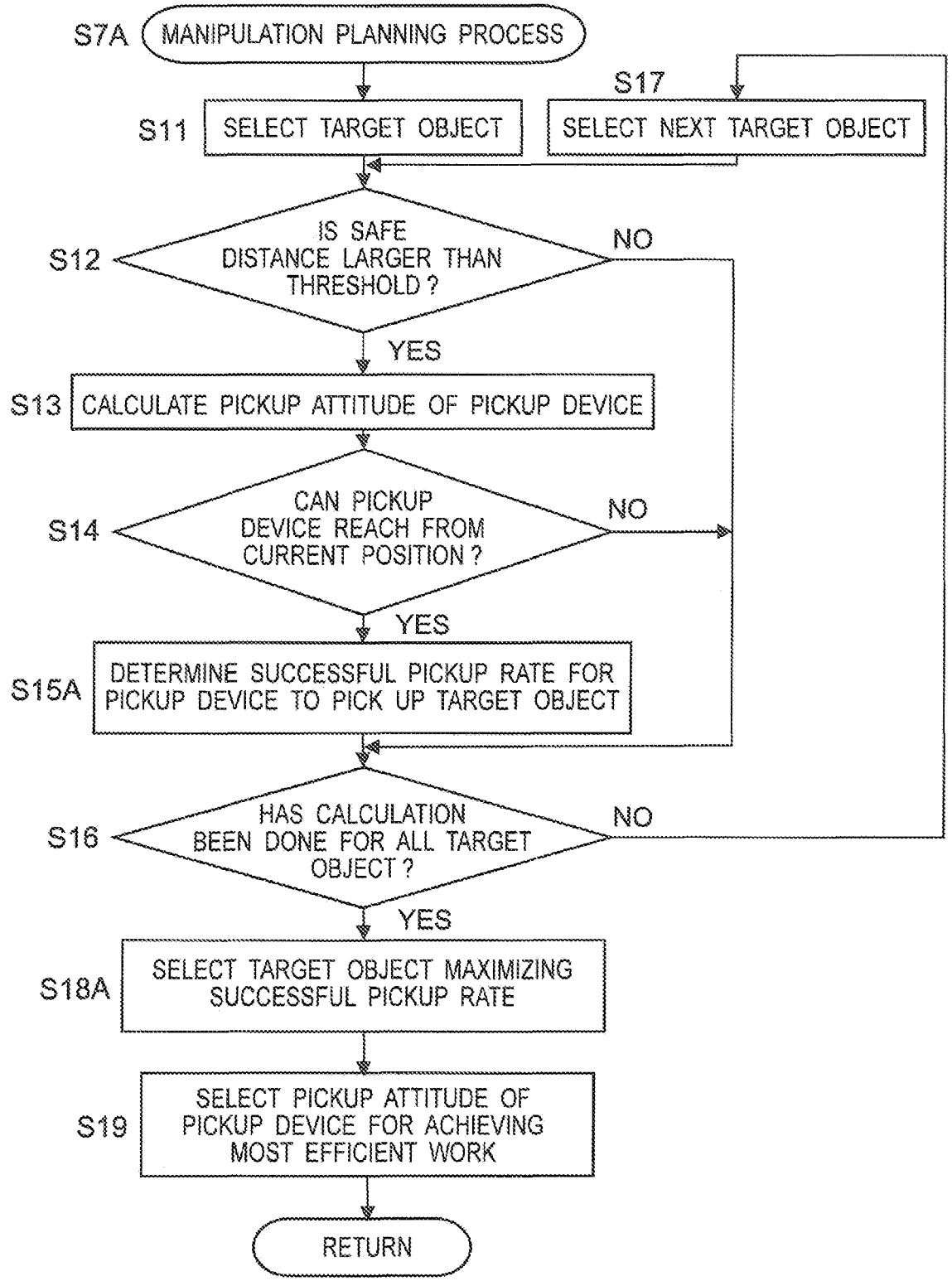
FIG. 17 is a first overall process flowchart performed by a manipulation controller of the object manipulation apparatus of FIG. 15.

FIG. 17 is a first overall process flowchart performed by the manipulation controller 4d of the object manipulation apparatus of FIG. 15. The manipulation planning process of FIG. 17 includes steps S15A and S18A, instead of steps S15 and S18 of FIG. 4. At step S15A, the manipulation controller 4d determines a successful pickup rate for the pickup device 3 to pick up a target object, based on the successful pickup rates estimated in advance and stored in the database, and based on the attitude of the target object and the pickup attitude of the pickup device 3. At step S18A, the manipulation controller 4d selects a target object maximizing the successful pickup rate, among target objects having safe distances longer than the threshold. Thus, according to the manipulation planning process of FIG. 17, the manipulation controller 4d determines the successful pickup rate for the pickup device 3 to pick up a target object, instead of calculating the moving time of the pickup device 3.

According to the manipulation planning process of FIG. 17, the information processing device 4C is preset with conditions of the highest successful pickup rate, for selecting a target object in a prioritized manner. The information processing device 4C selects a target object to pick up, according to the preset priority. Although it is desirable that the information processing device 4C select a target object having the highest successful pickup rate, the information processing device 4C may select a target object having a higher successful pickup rate than that of at least one other target object (i.e., a target object having the second, third, . . . , highest successful pickup rate). In addition, the information processing device 4C may select any one of a target object(s) having a successful pickup rate(s) higher than a predetermined threshold.

Figure 18:
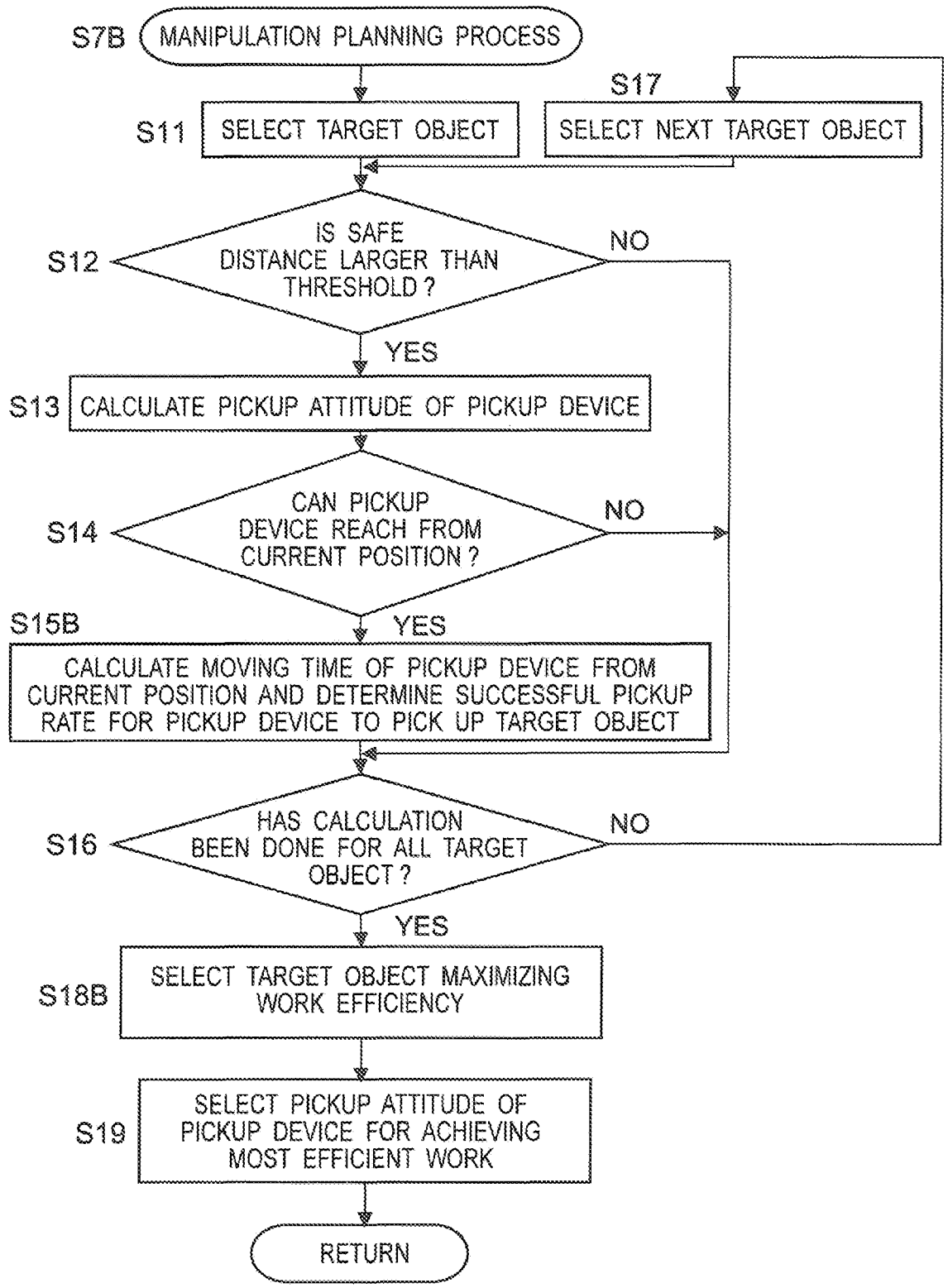
FIG. 18 is a second overall process flowchart performed by the manipulation controller of the object manipulation apparatus of FIG. 15.

When selecting a target object to pick up, a moving time may be considered in a manner similar to that of the first to third embodiments. With reference to FIG. 18, a manipulation planning process for a case of considering a moving time will be described.

FIG. 18 is a second overall process flowchart performed by the manipulation controller 4d of the object manipulation apparatus of FIG. 15. The manipulation planning process of FIG. 18 includes steps S15B and S18B, instead of steps S15 and S18 of FIG. 4. At step S15B, the manipulation controller 4d calculates a moving time of the pickup device 3 from its current position, and further determines a successful pickup rate for the pickup device 3 to pick up a target object. At step S18B, the manipulation controller 4d calculates work efficiency based on both the successful pickup rate and a moving time, and selects a target object maximizing work efficiency, among target objects having safe distances longer than the threshold. The work efficiency is given by, for example, an assumed moving time TA of the following equation.

$$TA = p \times T1 + (1-p) \times T2$$

Where, "p" denotes the successful pickup rate, "T1" denotes a moving time in the case that the target object is successfully picked up, and "T2" denotes a moving time in the case that picking up of the target object is failed and to be retried. It is determined that the shorter the assumed moving time TA is, the higher the work efficiency is.

According to the manipulation planning process of FIG. 18, the information processing device 4C is with conditions of the highest work efficiency, for selecting a target object in a prioritized manner. The information processing device 4C selects a target object to pick up, according to the preset priority. Although it is desirable that the information processing device 4C select a target object having the highest work efficiency, the information processing device 4C may select a target object having higher work efficiency than that of at least one other target object (i.e., a target object having the second, third, . . . , highest work efficiency). In addition, the information processing device 4C may select any one of a target object(s) having work efficiency higher than a predetermined threshold.

According to the manipulation planning processes of FIGS. 17 and 18, it is possible to select a target object and a pickup method allowing efficient work while determining the possibility of a collision with a human, in a manner similar to that of the first to third embodiments. Thus, it is possible to achieve more efficient work than simply reducing the operation speed of the apparatus.

Although the fourth embodiment describes selecting one of a plurality of target objects according to the priority related to the successful pickup rate, one of a plurality of pickup devices (see FIG. 13) or one of a plurality of pickup methods (see FIG. 14) may be selected according to the priority related to the successful pickup rate.

Fifth Embodiment

Figure 19:
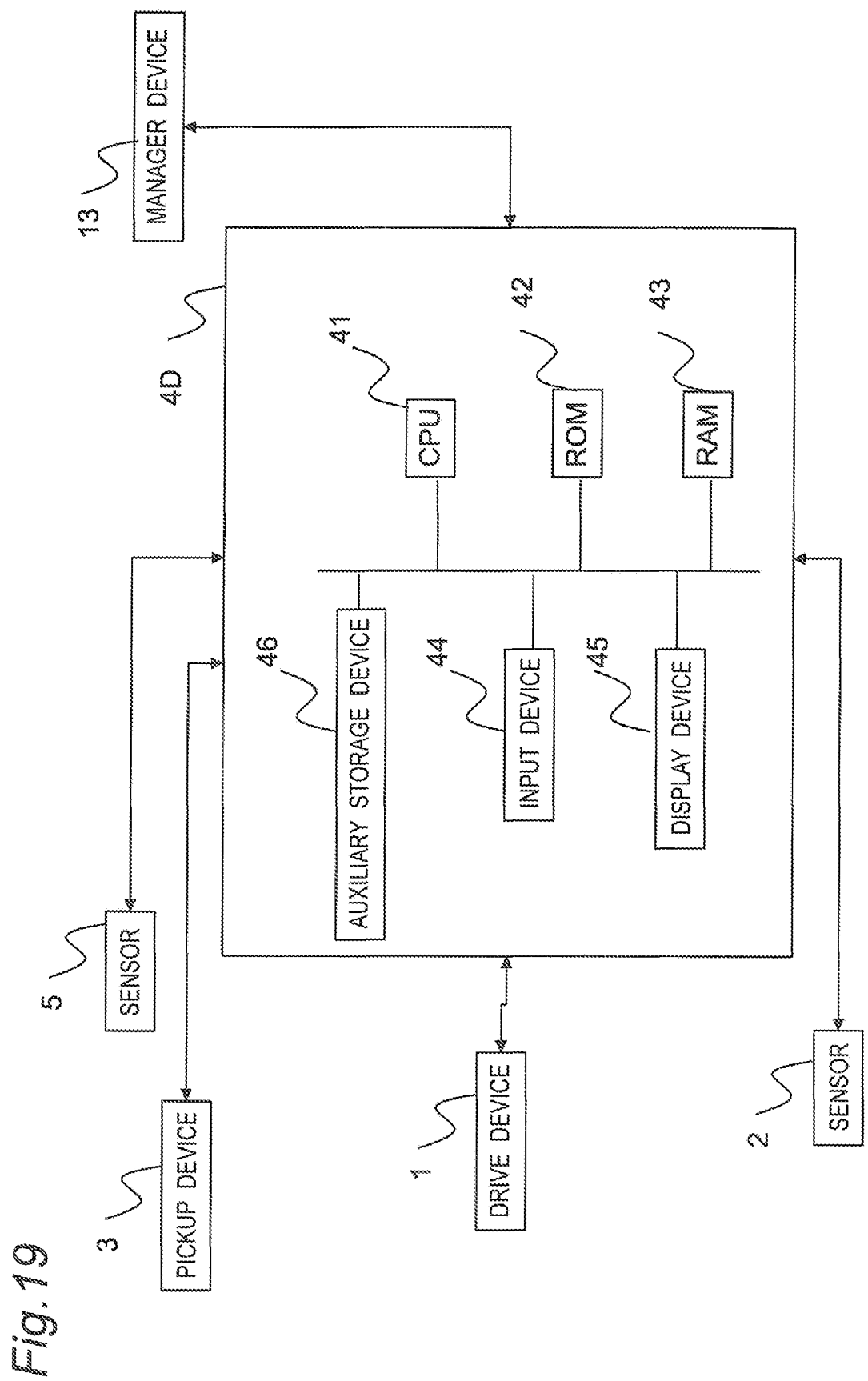
FIG. 19 is a hardware configuration diagram showing an object manipulation apparatus according to a fifth embodiment of the present invention.

FIG. 19 is a hardware configuration diagram showing an object manipulation apparatus according to a fifth embodiment of the present invention. The object manipulation apparatus of FIG. 19 is provided with an information processing device 4D, instead of the information processing device 4C of FIG. 15. The information processing device 4D is provided with similar components to those of the information processing device 4C of FIG. 15, and is further connected to an external manager device 13.

The manager device 13 is a personal computer or a server device that runs software for managing the overall work process, in sites such as a factory or a warehouse where the object manipulation apparatus according to the fifth embodiment is used. The manager device 13 may be a warehouse management system (WMS) for a warehouse, or may be a production management system for a production site.

Figure 20:
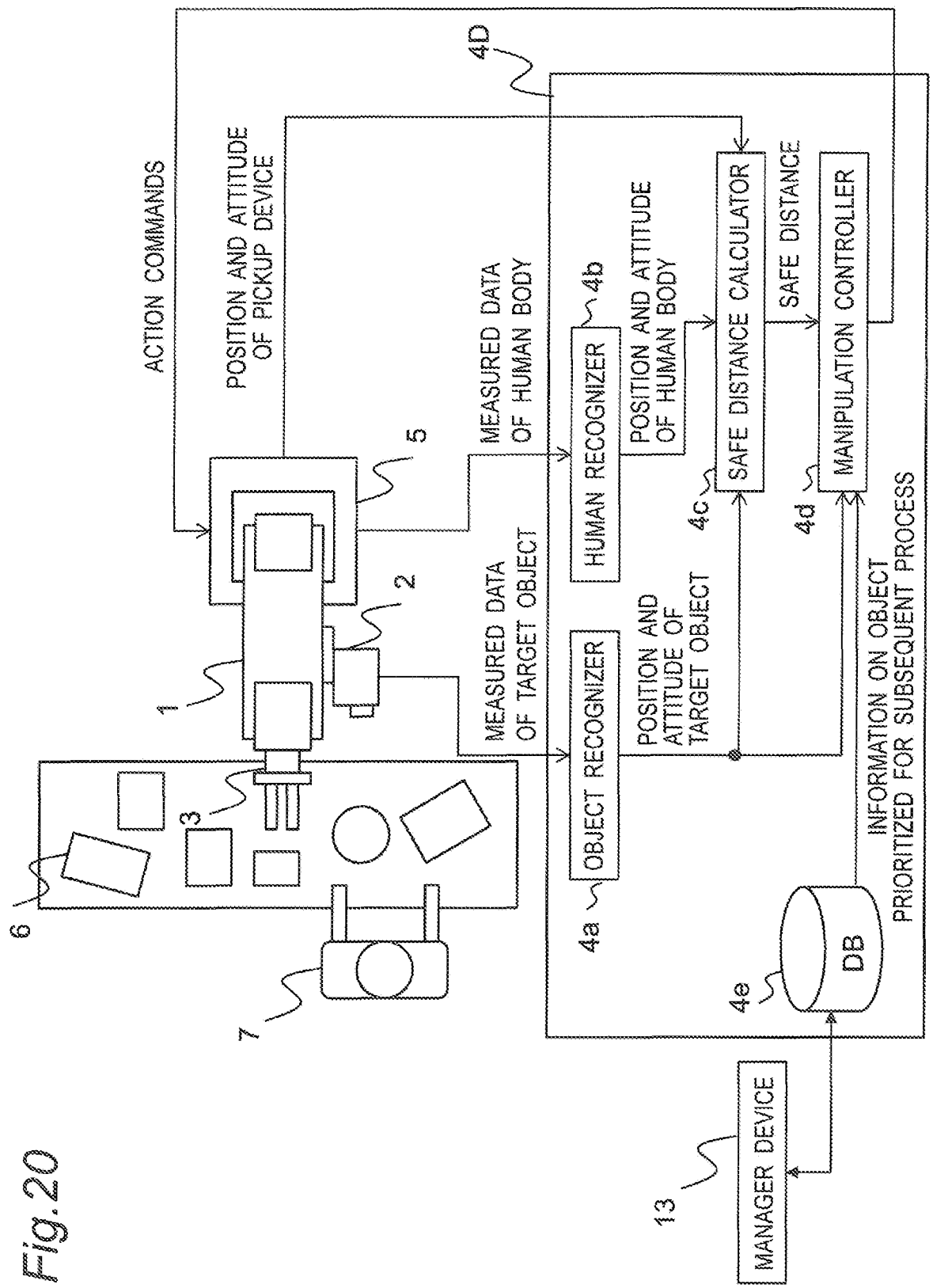
FIG. 20 is a functional diagram showing the object manipulation apparatus of FIG. 19.

FIG. 20 is a functional diagram showing the object manipulation apparatus of FIG. 19. Information about an object(s) prioritized for a subsequent process is transmitted from the manager device 13 to the information processing device 4D, and temporarily stored in a database 4e. The information about an object(s) prioritized for a subsequent process is, for example, the order of objects to be prioritized for assembling during production. The information about an object(s) prioritized for a subsequent process may be information about a good to be delivered next from a warehouse, or may be the order of objects (goods) required in a prioritized manner. The information about an object(s) prioritized for a subsequent process is transmitted from the database 4e to a manipulation controller 4d.

The object manipulation apparatus of FIG. 19 also operates according to the overall process flowchart of FIG. 3. However, the manipulation controller 4d of the information processing device 4D performs a manipulation planning process (step S7C) of FIG. 21, instead of the manipulation planning process (step S7) of FIG. 4.

Figure 21:
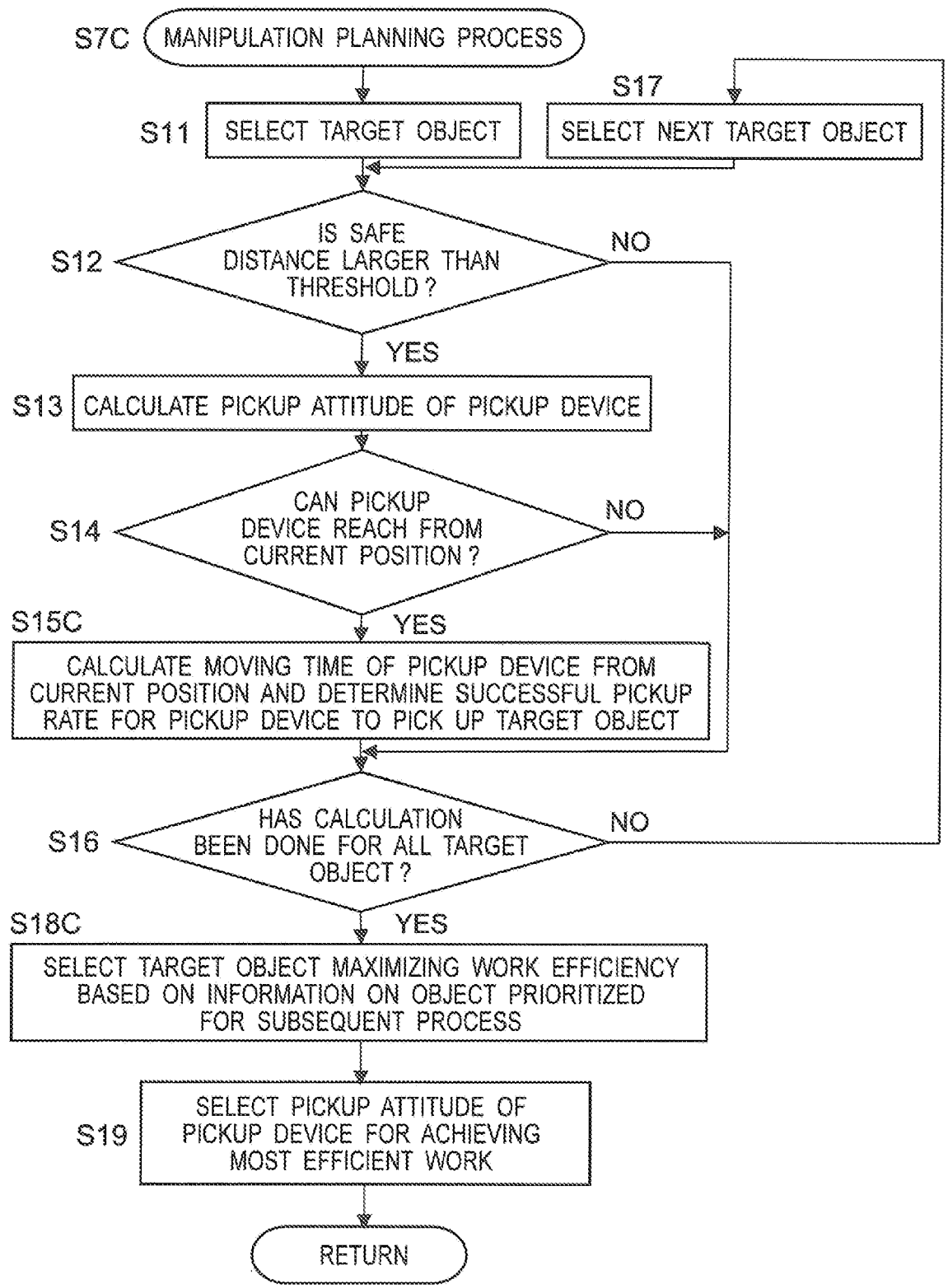
FIG. 21 is an overall process flowchart performed by a manipulation controller of the object manipulation apparatus of FIG. 19.

FIG. 21 is an overall process flowchart performed by the manipulation controller 4d of the object manipulation apparatus of FIG. 19. The manipulation planning process of FIG. 21 includes steps S15C and S18C, instead of steps S15 and S18 of FIG. 4. At step S15C, the manipulation controller 4d calculates a moving time of a pickup device 3 from its current position, and further determines a successful pickup rate for the pickup device 3 to pick up a target object. At step S18C, the manipulation controller 4d selects a target object maximizing work efficiency, among target objects having safe distances longer than the threshold, based on the information about an object(s) prioritized for a subsequent process.

According to the manipulation planning process of FIG. 21, the manipulation controller 4d may calculate an assumed moving time, for example, as described with reference to FIG. 18, and select a target object the most prioritized for a subsequent process, among a plurality of target objects having a shorter assumed moving time than that of at least one other target object. The manipulation controller 4d may select a target object having the shortest assumed moving time, among a plurality of target objects prioritized for a subsequent process. The manipulation controller 4d may select a target object prioritized for a subsequent process, above all. Thus, the information processing device 4D further uses information about an object(s) prioritized for a subsequent process, for selecting a target object in a prioritized manner.

According to the manipulation planning process of FIG. 21, it is possible to select a target object and a pickup method allowing efficient work while determining the possibility of a collision with a human, in a manner similar to that of the first to fourth embodiments. Thus, it is possible to achieve more efficient work than simply reducing the operation speed of the apparatus.

Although the fifth embodiment describes selecting one of a plurality of target objects according to the priority related to an object(s) prioritized for a subsequent process, one of a plurality of pickup devices (see FIG. 13) or one of a plurality of pickup methods (see FIG. 14) may be selected according to the priority related to an object(s) prioritized for a subsequent process.

The features of the above-described first to fifth embodiments may be combined with one another.

The embodiments of the present invention have the following features.

In a robot provided with a sensor and a pickup device, an object recognizer calculates the position and attitude of a target object from data measured by the sensor, a safe distance calculator calculates the possibility of a collision between the target object and a human, and a manipulation controller determines any one or more among a target object to be manipulated by the robot, a type of the pickup device, and a pickup method of the pickup device, based on the position and attitude of the target object, and based on a safe distance for the target object.

Thus, it is possible to achieve efficient and safe manipulation of the target object by changing a target object to be manipulated, a pickup device, and a pickup method, while considering the risk of a collision with a human.

The manipulation controller calculates action commands so as to select a target object according to a predetermined priority, among target objects having safe distances within an arbitrary range, and pick up the selected target object in a prioritized manner.

Thus, it is possible to achieve efficient and safe manipulation of the target object by changing a target object to be manipulated, a pickup device, and a pickup method, while considering the risk of a collision with a human.

The manipulation controller calculates action commands so as to select at least one of: a target object allowing the pickup device to move from the robot's current attitude to a position and an attitude so as to reduce a pickup operation time, a target object having a high successful pickup rate, and a target object prioritized for a subsequent process, among target objects having safe distances within an arbitrary range, and pick up the selected target object in a prioritized manner.

Thus, it is possible to select a target object manipulated in the most efficient manner, while achieving safety.

When the manipulation controller can calculate a plurality of positions and attitudes of the pickup device for picking up a target object, the manipulation controller estimates the risk of a collision with a human based on directions of action for pickup, and calculates action commands to pick up the target object using the pickup device at a position and an attitude capable of reducing the risk of a collision with the human, in a prioritized manner.

Thus, it is possible to select a safe, efficient, and stable pickup method (the position and attitude of the pickup device relative to the target object).

The robot has a plurality of pickup devices, and the manipulation controller estimates the risk of a collision with a human based on directions of action for pickup, and calculates action commands to pick up the target object using a type of pickup device capable of reducing the risk of a collision with the human, in a prioritized manner.

Thus, it is possible to select a safe pickup device.

The robot has a plurality of pickup method, and the manipulation controller estimates the risk of a collision with a human based on directions of action for pickup, and calculates action commands to pick up the target object using a pickup method capable of reducing the risk of a collision with the human, in a prioritized manner.

Thus, it is possible to select a safe and efficient pickup method.

The safe distance calculator determines the possibility of a collision between the robot and a human, based on the position and attitude of the target object, or a tip position of the pickup device when manipulating the target object, and based on a position and an attitude of the human calculated by a human recognizer from data measured by the sensor.

Thus, it is possible to sequentially calculate the risk of a collision with a human, to achieve more safe and efficient manipulation of the target object.

The safe distance calculator determines the possibility of a collision between the robot and a human, based on a tip position of the pickup device when manipulating the target object, and based on information on any predetermined point(s) or plane in space.

Thus, it is possible to define in advance the risk of a collision with a human in work space, to achieve more safe and efficient manipulation of the target object.

According to the embodiment of the present invention, it is possible to automatically selecting a target object to be manipulated by an automatic machine, a pickup device of the automatic machine for manipulating the target object, and/or a pickup method, dependent on the possibility of a collision with a human, and therefore, it is possible to achieve work with high efficiency even if the human approaches.

INDUSTRIAL APPLICABILITY

The present invention is applicable to an object manipulation apparatus and an object manipulation method for an automatic machine sharing work space with a human, and achieving safe and efficient manipulation of a plurality of target objects, the automatic machine being provided with means for sensing a surrounding environment, and means for picking up and manipulating the target objects.

REFERENCE SIGNS LIST

1: DRIVE DEVICE,
2: SENSOR,
3: PICKUP DEVICE,
4, 4A to 4D: INFORMATION PROCESSING DEVICE,
4a: OBJECT RECOGNIZER,
4b: HUMAN RECOGNIZER,
4c: SAFE DISTANCE CALCULATOR,
4d: MANIPULATION CONTROLLER,
4e: DATABASE (DB),
5: SENSOR,
6: TARGET OBJECT,
7: HUMAN,
8: ANY PREDETERMINED PLANE,
9: SAFE DISTANCE,
10: PICKUP DEVICE,
11: SUCTION-TYPE PICKUP DEVICE,
12: PINCH-TYPE PICKUP DEVICE,
13: MANAGER DEVICE,
41: CPU,
42: ROM,
43: RAM,
44: INPUT DEVICE,
45: DISPLAY DEVICE, and
46: AUXILIARY STORAGE DEVICE.

The invention claimed is:

1. An object manipulation apparatus comprising:
   at least one sensor;
   at least one pickup device for picking up and manipulating at least one target object;
   processing circuitry configured as an object recognizer that recognizes a position and an attitude of the target object based on data measured by the sensor;
   the processing circuitry further configured as a distance calculator that calculates a distance from the target object to a certain object which is other than the object manipulation apparatus and the target object; and
   the processing circuitry further configured as a manipulation controller that controls the at least one pickup device based on the position and the attitude of the target object, and based on the distance from the target object to the certain object, and the manipulation controller determines a threshold based on at least one of a weight and a speed of the at least one pickup device,
   wherein, when there are a plurality of target objects from which the target object is to be selected by the object manipulation apparatus, the manipulation controller selects, as the target object, one of the plurality of target objects having a distance to the certain object longer than the threshold, and manipulates the selected target object using the at least one pickup device.

2. The object manipulation apparatus as claimed in claim 1,
   wherein the manipulation controller selects one of the target objects having distances to the certain object longer than the threshold, according to a predetermined priority, and manipulates the target object using the at least one pickup device.

3. The object manipulation apparatus as claimed in claim 2,
   wherein the manipulation controller selects a target object among the target objects having a distance to the certain object longer than the threshold, and manipulates the selected target object using the at least one pickup device, the selected target object being at least one of:
   a target object having a shorter moving time of the at least one pickup device than a moving time of the at least one pickup device for at least one other target object;
   a target object having a higher successful pickup rate than a successful pickup rate of at least one other target object; and
   a target object prioritized for a subsequent process.

4. The object manipulation apparatus as claimed in claim 1, wherein the at least one pickup device includes a plurality of pickup devices to be selected,
   wherein the manipulation controller estimates positions of the target object manipulated by each of the plurality of pickup devices, selects one of the plurality of pickup devices having distances from the estimated positions to the certain object longer than the threshold, and manipulates the selected target object.

5. The object manipulation apparatus as claimed in claim 4,
   wherein the manipulation controller selects a pickup device among the plurality of pickup devices having a distance from the estimated positions to the certain object longer than the threshold, and manipulates the target object, the selected pickup device being at least one of:
   a pickup device having a shorter moving time than a moving time of at least one other pickup device:
   a pickup device having a higher successful pickup rate than a successful pickup rate of at least one other pickup device; and
   a pickup device prioritized for a subsequent process.

6. The object manipulation apparatus as claimed in claim 1, wherein the at least one pickup device includes a plurality of pickup methods to be selected,
   wherein the manipulation controller estimates positions of the target object manipulated by the pickup methods, selects one of the plurality of pickup methods having a distance from the estimated positions to the certain object longer than the threshold, and manipulates the target object.

7. The object manipulation apparatus as claimed in claim 6,
   wherein the manipulation controller selects a pickup method among the plurality of pickup methods having the distance from the estimated positions to the certain object longer than the threshold, and manipulates the target object, the selected pickup method being at least one of:
   a pickup method having a shorter moving time than a moving time of the pickup device using at least one other pickup method;
   a pickup method having a higher successful pickup rate than a successful pickup rate of at least one other pickup method; and
   a pickup method prioritized for a subsequent process.

8. The object manipulation apparatus as claimed in claim 1, wherein the at least one sensor is configured to measure the distance from the target object to the certain object which is other than the object manipulation apparatus and the target object.

9. The object manipulation apparatus as claimed in claim 1, further comprising a memory that stores in advance the distance from the target object to the certain object which is other than the object manipulation apparatus and the target object.

10. The object manipulation apparatus as claimed in claim 1,
wherein the manipulation controller determines the threshold so as to increase the threshold as a weight and a speed of the at least one pickup device increase, and decrease the threshold as the weight and the speed of the at least one pickup device decrease.

11. An object manipulation method for an object manipulation apparatus comprising at least one sensor and at least one pickup device, the object manipulation method for picking up and manipulating at least one target object using the at least one pickup device, the object manipulation method including steps of:
recognizing a position and an attitude of the target object based on data measured by the sensor;
calculating a distance from the target object to a certain object which is other than the object manipulation apparatus and the target object;
controlling the at least one pickup device based on the position and the attitude of the target object, and based on the distance from the target object to the certain object;
determining a threshold based on at least one of a weight and a speed of the at least one pickup device; and
when there are a plurality of target objects from which the target object is to be selected, controlling the at least one pickup device includes selecting, as the target object, one of the plurality of target objects having a distance to the certain object longer than the threshold, and manipulating the selected target object using the at least one pickup device.

12. An object manipulation apparatus comprising:
at least one sensor;
at least one pickup device for picking up and manipulating at least one target object;
an object recognizer that recognizes a position and an attitude of the target object based on data measured by the sensor
a distance calculator that calculates a distance from the target object to a certain object which is other than the object manipulation apparatus and the target object; and
a manipulation controller that controls the at least one pickup device based on the position and the attitude of the target object, and based on the distance from the target object to the certain object, and the manipulation controller determines a threshold based on at least one of a weight and a speed of the at least one pickup device,
wherein, when there are a plurality of target objects from which the target object is to be selected by the object manipulation apparatus, the manipulation controller selects, as the target object, one of the plurality of target objects having a distance to the certain object longer than the threshold, and manipulates the selected target object using the at least one pickup device.

13. The object manipulation apparatus as claimed in claim 1,
wherein the distance calculator is further configured to calculate the distance from the target object to the certain object which is other than a stationary object.

14. The object manipulation apparatus as claimed in claim 1,
wherein the certain object is a human.

* * * * *